United States Patent
Shida et al.

(10) Patent No.: US 7,331,046 B2
(45) Date of Patent: Feb. 12, 2008

(54) PROGRAM AND INFORMATION PROCESSING METHOD

(75) Inventors: Nobutoshi Shida, Tokyo (JP); Toshihiko Fujishiro, Tokyo (JP)

(73) Assignee: Sony Corporation (JP)

( * ) Notice: Subject to any disclaimer, the term of this patent is extended or adjusted under 35 U.S.C. 154(b) by 620 days.

(21) Appl. No.: 10/854,665

(22) Filed: May 26, 2004

(65) Prior Publication Data

US 2005/0015582 A1  Jan. 20, 2005

(30) Foreign Application Priority Data

May 26, 2003  (JP)  ............................ P2003-148085

(51) Int. Cl.
*G06F 9/44* (2006.01)
(52) U.S. Cl. .................... 717/162; 717/165; 713/1; 713/2
(58) Field of Classification Search ................ 717/162, 717/165; 713/1, 2
See application file for complete search history.

(56) References Cited

U.S. PATENT DOCUMENTS 5,307,497 A   4/1994 Feigenbaum et al.
6,052,778 A * 4/2000 Hagy et al. ..................... 713/2
6,098,158 A * 8/2000 Lay et al. ..................... 711/162
6,279,109 B1 * 8/2001 Brundridge .................... 713/2
6,374,353 B1 * 4/2002 Settsu et al. .................... 713/2

FOREIGN PATENT DOCUMENTS

JP   5-257696 A   10/1993

* cited by examiner

*Primary Examiner*—Tuan Dam
*Assistant Examiner*—Zheng Wei
(74) *Attorney, Agent, or Firm*—Lerner, David, Littenberg, Krumholz & Mentlik, LLP

(57) ABSTRACT

A program of the present invention is compatible with a plurality of system configurations. When a process jumps to a bootstrap body, CPU configuration and initialization of a timer and a data cache are performed. When the process is not executed on a cache RAM or when the process is executed in an external mode or a ROMless state, data is copied from ROM to RAM, and then the process jumps to a cache RAM area. Then, initialization of a stack, setting of an interrupt vector, and initialization of a heap are sequentially performed. The present invention can be applied to an apparatus for developing a system LSI.

10 Claims, 16 Drawing Sheets

FIG. 9

| BOOT AREA | APPLICATION PROGRAM LAYOUT AREA | | | |
|---|---|---|---|---|
| | NON-CACHE RAM | CACHE RAM | NON-CACHE ROM | CACHE ROM |
| NON-CACHE RAM | R | F | — | — |
| CACHE RAM | R | P | — | — |
| NON-CACHE ROM | P | F | R | — |
| CACHE ROM | — | — | — | — |

PROGRAM AND INFORMATION PROCESSING METHOD

CROSS-REFERENCE TO RELATED APPLICATIONS

The present application claims priority from Japanese Application No. 2003-148085 filed May 26, 2003, the disclosure of which is hereby incorporated by reference herein.

BACKGROUND OF THE INVENTION

The present invention relates to a program and an information processing method. In particular, the present invention relates to a program and an information processing method which are compatible with two boot methods: autonomous boot for autonomously booting up the program from a ROM incorporated in a CPU or externally connected; and heteronomous boot for heteronomously booting up the program by copying firmware onto a RAM under control of an external host or a debugger, and which can be seamlessly used in development and commercialization without modifying the program.

In recent years, system LSIs (large scale integration) have been incorporated into various apparatuses. The system LSI basically includes a CPU (central processing unit), a memory (for example, ROM (read-only memory) and RAM (random-access memory)), and an I/O (input/output) unit, which are integrated in a single LSI chip.

As mentioned above, the system LSIs are incorporated into various apparatuses. For example, they are incorporated into home electrical appliances, audio-video equipment, office-automation equipment, industrial apparatuses, and automobiles, and are used for controlling the systems, networks, and user interfaces therein. The function to be provided in each system LSI differs depending on its use, and thus respective system LSIs have characteristics for particular applications. Therefore, numerous types of system LSIs have been developed for satisfying various requirements.

Also, high-performance system LSIs have been manufactured. In this type of system LSI, a versatile high-performance CPU core, a memory, a versatile I/O unit, and peripheral circuits are combined into one chip, and the system can be expanded by attaching an external memory and an I/O unit thereto.

In any type of system LSI, a versatile circuit function, such as parallel I/O; serial I/O; input port with comparator, counter/timer; A/D (analog/digital) converter; DMA (direct memory access) controller; interrupt controller; and bus controller, and an application-specific peripheral-circuit function, such as PWM (pulse width modulation) controller; stepping-motor controller; liquid-crystal display controller; and DTMF (dial tone multi frequency) circuit, are integrated in one chip together with a CPU and a memory as necessary.

Compared with a board computer, which is formed by combining a CPU chip, a memory chip, and a plurality of peripheral circuit chips on a wiring board, the system LSI is more useful for realizing a compact and inexpensive apparatus. Therefore, the system LSI is often used.

The storage of a program required for operating the system LSI is disclosed in Japanese Unexamined Patent Application Publication No. 5-257696.

In a system LSI, a program boots up by autonomous boot from a ROM either incorporated in a CPU or externally connected, or by heteronomous boot by copying firmware onto a RAM under the control of an external host or a debugger. If the design including the boot method is changed at the development and commercialization of the system LSI, verification and performance evaluation must be performed again.

SUMMARY OF THE INVENTION

The present invention has been made in view of these circumstances, and an object of the present invention is to provide a system and method in which verification and performance evaluation need not be performed again after changing the design of an application program.

The present invention provides a system or method for creating an application for an apparatus. The apparatus includes at least a CPU; one of a volatile memory and a nonvolatile memory which include a boot memory area including a reset vector, the volatile memory being rewritable by a part other than the CPU and the nonvolatile memory being replaceable by a part other than the CPU; and one of a volatile memory and a nonvolatile memory which include a cache-executable or non-cache-executable application execution memory area, which are rewritable by a part other than the CPU, and in which initialization of a memory controller and read/write can be performed by the CPU, the memory controller being able to be initialized by a part other than the CPU as necessary in the volatile memory and the memory controller not being able to be initialized or not being required to be initialized by a part other than the CPU in the nonvolatile memory. The apparatus is able to execute an operating system and an application using the operating system and to execute a free-standing application in which the operating system is not used. In the system or information processing method, an application program and a bootstrap are linked so as to form a single execution file such that the entry point of the bootstrap corresponds to the entry point of the execution file; based on the input linked file, the entry point, the bootstrap, and the application program are mapped to a layout address in the application execution memory area so as to generate the execution file; the layout address in the application execution memory area corresponds to an area which is cached or not cached by the CPU; the execution file includes the layout address and the application program and the bootstrap to be mapped; when the application program is initially placed in the boot memory area, the layout address is offset-converted to an address as a load destination so that the entry point of the execution file is mapped to the reset vector in the corresponding boot memory area, whereby the input execution file is output as a load image file; when the application program is initially placed in the application execution memory area and when the placed area is not cached by the CPU, the execution file is output as-is as a load image file; when the layout address and the application program to be mapped in the execution file are initially placed in the application execution memory area and when the placed area is cached by the CPU, in order to reliably load the application program and the bootstrap to a RAM regardless of the state of a cache, the layout address is offset-converted to an address as a load destination so that the entry point of the execution file is mapped to a non-cache area of the CPU corresponding to this area, whereby the input execution file is output as a load image file; the load image file includes the address as the load destination and the application program and the bootstrap to be loaded; and when a file format different from that of the load image file is required, the format of the load image file is converted to the required format.

The stored execution file may include a file of the layout address and a file of the application program and the bootstrap to be mapped. Also, the stored load image file may include a file of the address as the load destination and a file of the application program and the bootstrap to be loaded.

When the application program is initially placed in the application execution memory area, initialization is performed by a part other than the CPU. An address and data to be initially placed are loaded in an area where the load image file is to be initially placed by using the address as the load destination and the application program and the bootstrap to be loaded stored in the load image file.

When the application program is loaded in the boot memory area, the reset of the CPU is released. When the application program is loaded in the application execution memory area and when software can be started up from a part other than the boot area, a program counter is rewritten so as to indicate the loaded entry point, so as to start execution of the CPU. When the application program is loaded in the application execution memory area and when the program counter cannot be rewritten, an instruction to jump to the loaded entry point is written in the reset vector, so as to release reset of the CPU.

The application program is programmed by a high-level language and an assembler and includes nonrelocatable code in an absolute format. The bootstrap includes relocatable code and nonrelocatable code in the absolute format, and is started from the relocatable code and jumps to the nonrelocatable code area by using an absolute address branch instruction so as to execute the nonrelocatable code. In the relocatable code, initialization of the CPU and data cache and a process according to a difference in a memory area to be started are performed. The application program can boot from the boot memory area and performs initialization of an instruction cache and a memory controller and copy of a code unit and initialization data of the application program from the boot memory area to the application execution memory area, as the process according to a difference in a memory area to be started. The application program can also boot from the application execution memory area which is mapped as a non-cache area of the CPU and performs initialization of the instruction cache as the process according to a difference in a memory area to be started. The application program can also boot from the application execution memory area which is mapped as a cache area of the CPU and does not perform anything as the process according to a difference in a memory area to be started. In the nonrelocatable code, initialization of a stack area, zero-initialization of C/C++ non-initialized data, setting of exception/interrupt vector, initialization of a heap area, execution of a constructor and initializer for C++ global variable, flush of an entire data cache, and clearing an entire instruction cache are performed as an initialization process for a processing system, so as to jump to a main routine or to an initialization routine of the operating system. In the relocatable code of the bootstrap, a relative address branch instruction of the program counter is used for branch, call for functions, and reference to symbol in the bootstrap. In the relocatable code of the bootstrap, the offset of an execution address and a link address is added so as to calculate a branch destination and a return address and to perform reference to symbol for call for functions and reference to symbol outside the bootstrap. When the application program boots from the application execution memory area which is mapped as a cache area of the CPU, coherence of the instruction cache and data cache is kept. When the application program boots from the application execution memory area which is mapped as a cache area of the CPU and when a multiprocessor is applied, memory coherence between processors is kept.

According to the system of the present invention, an application program and bootstrap can be seamlessly used at development and commercialization without modifying them in any boot method. If an execution device and an execution environment for the application are satisfied, the application program can be developed before determining whether a physical device corresponding to a boot memory area is volatile or nonvolatile. When a ROM serves as the boot memory area, the ROM must be rewritten or a ROM ICE must be used in order to modify the firmware. In the present invention, however, the application program can boot from the application execution memory area without performing such a complicated process.

BRIEF DESCRIPTION OF THE DRAWINGS

FIG. 9 illustrates boot conditions.

DETAILED DESCRIPTION

Hereinafter, an embodiment of the present invention will be described with reference to the drawings. One of the features of the present invention is that a single program can be used for a plurality of configurations. First, the plurality of configurations will be explained. Herein, the plurality of configurations mean configurations including a system LSI (large scale integration) at the core. Considering development through commercialization of the system LSI, the configurations shown in FIGS. 1 to 6 can be realized.

A program for a system LSI is usually stored in an internal ROM (read-only memory, sometimes called a program memory) provided in the same chip as a CPU or in an external ROM, and the program in the ROM is executed in order from a reset vector (or starting address) upon power-up. The configuration of each system LSI differs depending on whether it includes a ROM therein.

Figure 3:
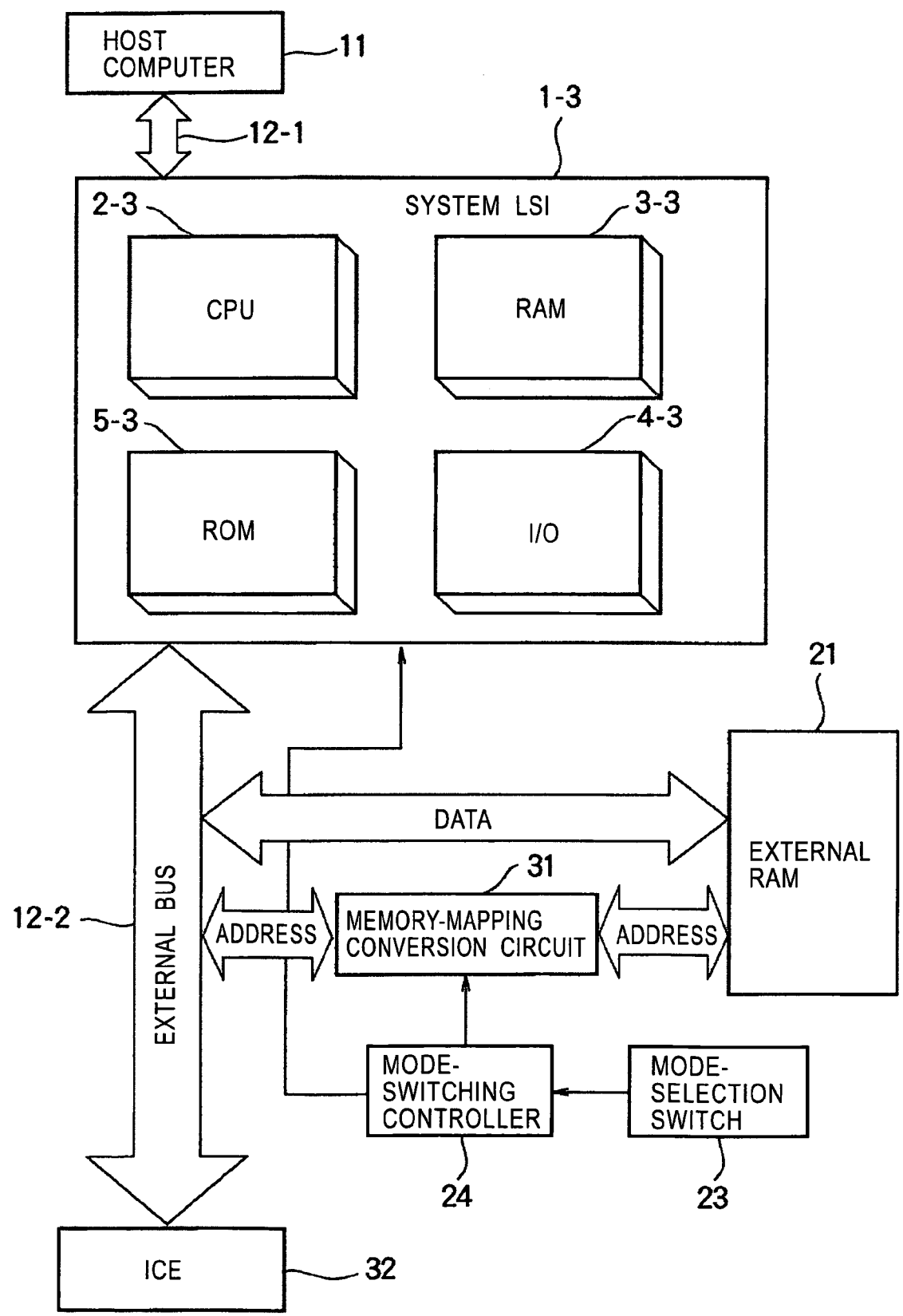
FIG. 3 shows a configuration including a system LSI.
Figure 4:
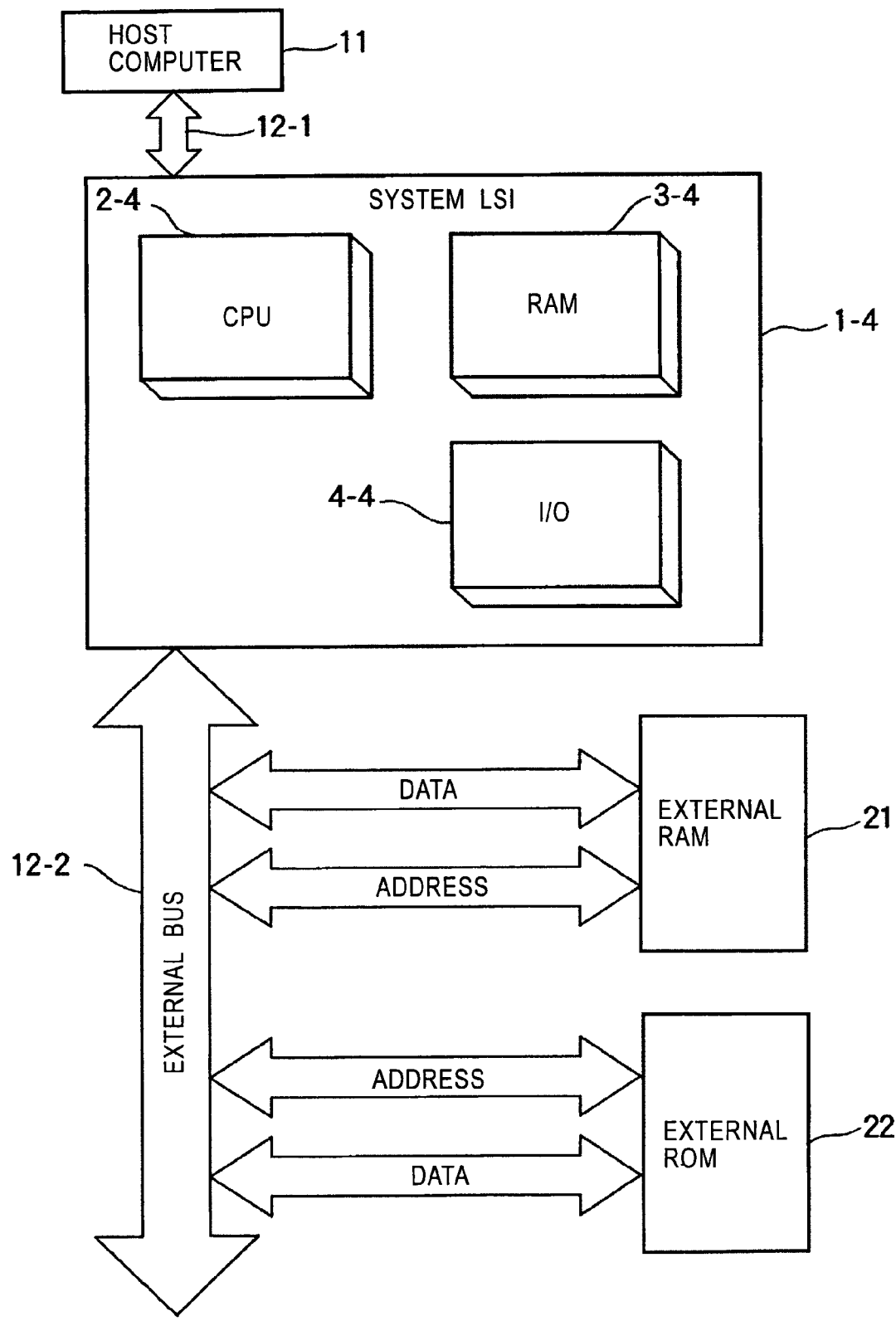
FIG. 4 shows a configuration including a system LSI.
Figure 5:
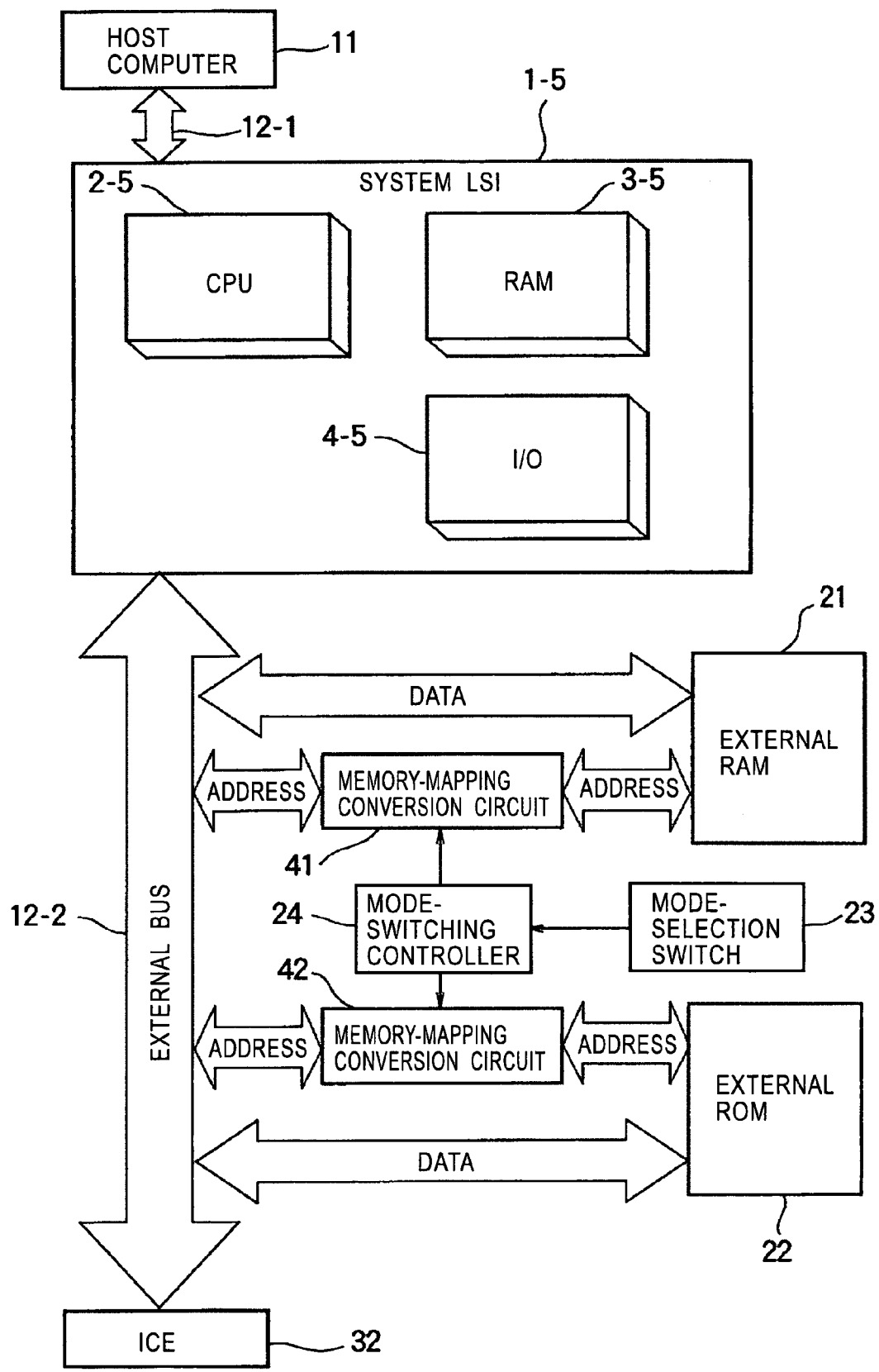
FIG. 5 shows a configuration including a system LSI.
Figure 6:
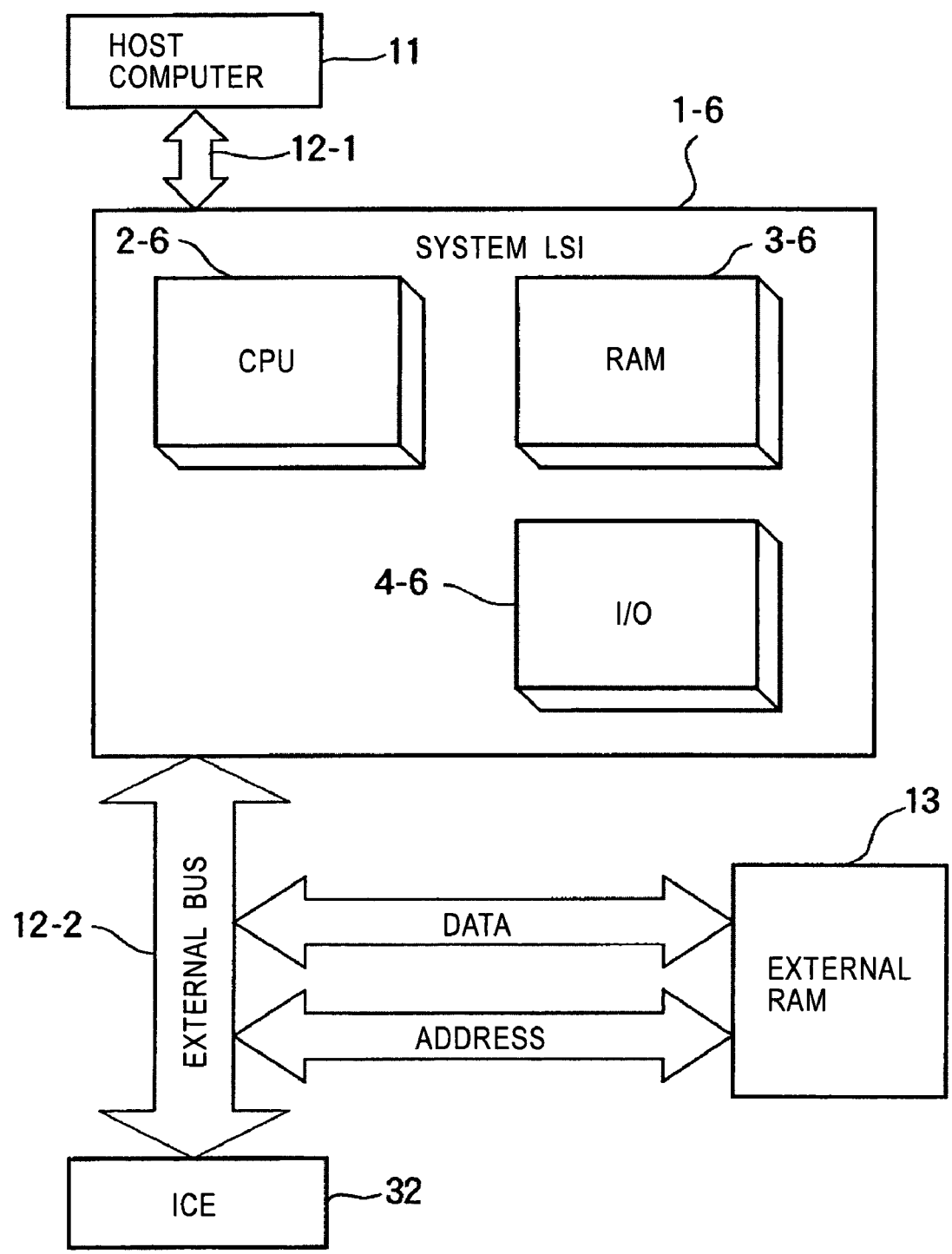
FIG. 6 shows a configuration including a system LSI.

In the following description, "internal" means that a ROM is provided in the same chip as the system LSI and "external" means that a ROM is provided separately from the system LSI chip. Each of FIGS. 1 to 3 is a block diagram showing an internal-ROM-type configuration and each of FIGS. 4 to 6 is a block diagram showing an external-ROM-type configuration.

Figure 1:
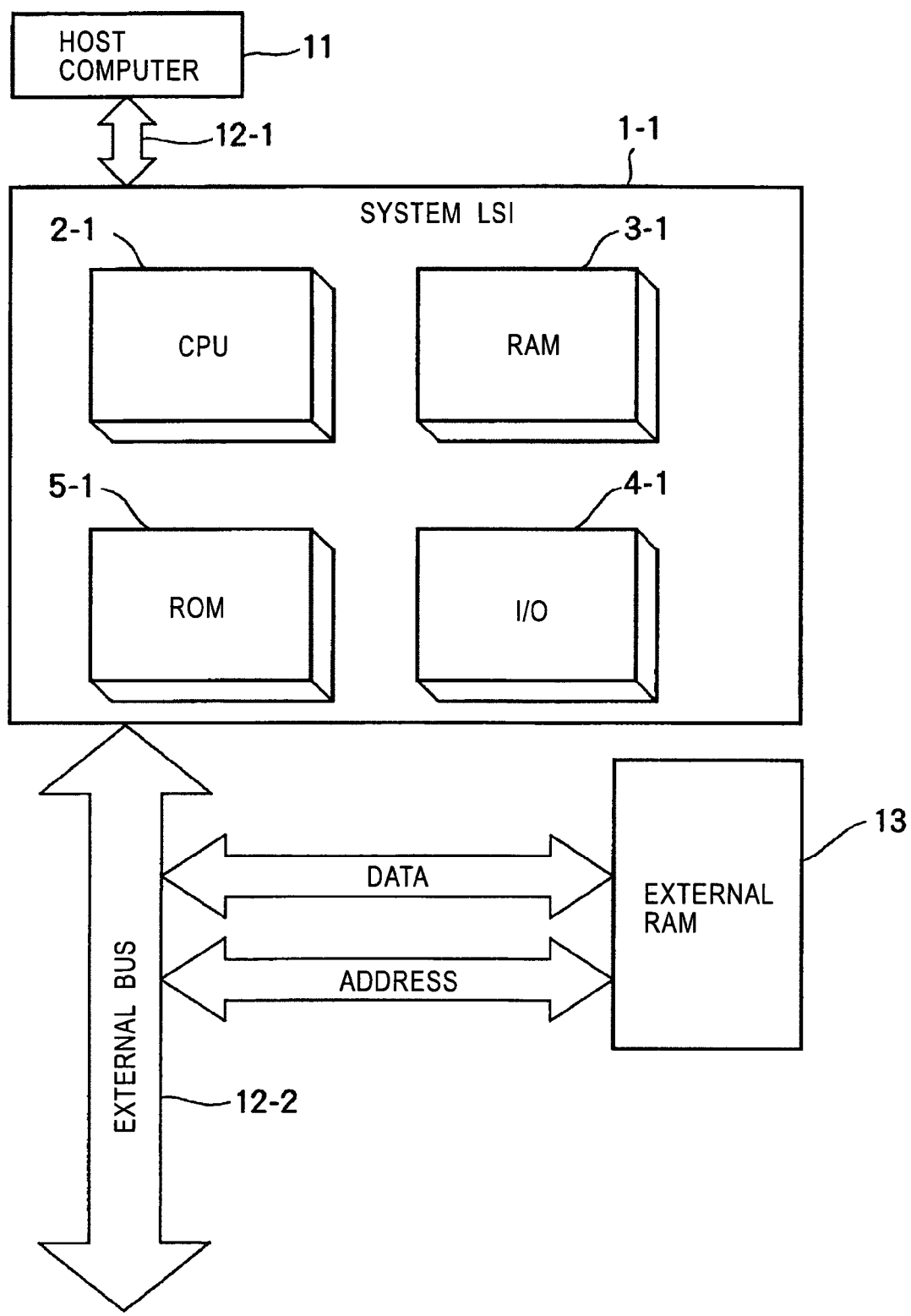
FIG. 1 shows a configuration including a system LSI.

The system LSI 1-1 shown in FIG. 1 includes a CPU (central processing unit) 2-1, a RAM 3-1, an I/O (input/output) unit 4-1, and a ROM 5-1.

The system LSI 1-1 can transmit data to and receive data from a host computer 11 through an external bus 12-1. Also, the system LSI 1-1 can transmit and address data to and receive data from an external RAM 13 ("external" is added for distinguishing from the ROM 5-1 inside the system LSI 1-1) through an external bus 12-2.

Figure 2:
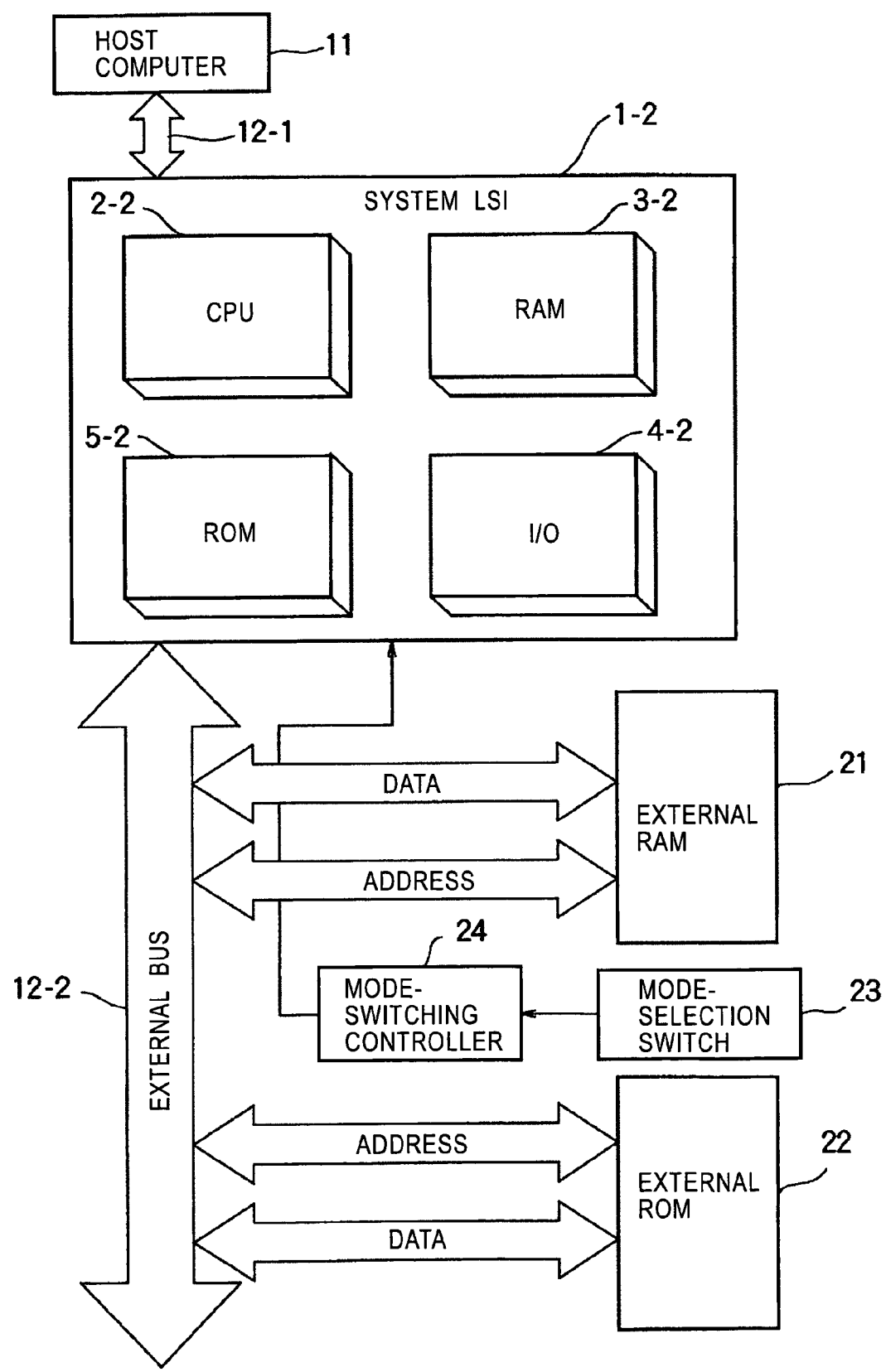
FIG. 2 shows a configuration including a system LSI.

As in FIG. 1, the system LSI 1-2 shown in FIG. 2 includes a CPU 2-2, a RAM 3-2, an I/O unit 4-2, and a ROM 5-2. The system LSI 1-2 can transmit data to and receive data from the host computer 11 through the external bus 12-1. Also, the system LSI 1-2 can transmit and address data to and receive data from an external RAM 21 and an external ROM 22 through the external bus 12-2.

Further, in the configuration shown in FIG. 2, a mode-selection switch 23 and a mode-switching controller 24 are provided. The mode-switching controller 24 switches modes based on the operation of the mode-selection switch 23. The modes will be described later.

Likewise, mode switching can be performed in the configuration shown in FIG. 3. The system LSI 1-3 shown in FIG. 3 includes a CPU 2-3, a RAM 3-3, an I/O unit 4-3, and a ROM 5-3, as in FIGS. 1 and 2.

Mode switching also can be performed in the configuration shown in FIG. 3. When the modes are switched by the mode-selection switch 23 and controlled by the mode-switching controller 24, address data is generated in accordance with the control of a memory-mapping conversion circuit 31. Also, in the configuration shown in FIG. 3, the system LSI 1-3 can transmit data to and receive data from a microcomputer development supporting device called an ICE (in-circuit emulator) 32 through the external bus 12-2.

In FIG. 3, the system LSI 1-3 can transmit data to and receive data from the ICE 32. Alternatively, the configuration may be designed so that the system LSI 1-3 can transmit data to and receive data from the host computer 11 instead of the ICE 32 (at commercialization after development).

In FIG. 4, the system LSI 1-4 does not include an internal ROM. More specifically, the system LSI 1-4 includes a CPU 2-4, a RAM 3-4, and an I/O unit 4-4, but does not include a ROM. Also, the system LSI 1-4 can transmit data to and receive data from the external RAM 21 and the external ROM 22 through the external bus 12-2.

In the configuration shown in FIG. 5, the system LSI 1-5 includes a CPU 2-5, a RAM 3-5, and an I/O unit 4-5, as in FIG. 4. In the configuration shown in FIG. 5, a mode-selection switch 23 for switching modes and a mode-switching controller 24 are provided. Also, a memory-mapping conversion circuit 41 for generating address data used between the system LSI 1-5 and the external RAM 21 and a memory-mapping conversion circuit 42 for generating address data used between the system LSI 1-5 and the external ROM 22 based on the control by the mode-switching controller 24 are provided.

The configuration shown in FIG. 6 is basically the same as that in FIG. 1 except that the system LSI 1-6 does not include an internal ROM (corresponding to the ROM 5-1). In the configuration shown in FIG. 6, the system LSI 1-6 can transmit data to and receive data from the ICE 32 (or the host computer 11) through the external bus 12-2 (or the external bus 12-1).

The configurations shown in FIGS. 1 to 6 can be realized, and each of these configurations is appropriately chosen according to the following conditions. System LSIs incorporated into mass-produced products, such as consumer-oriented apparatuses, are classified into an internal-mask-ROM-type (for example, the ROM 5-1 in FIG. 1 is regarded as a mask ROM) or an external-mask-ROM-type (for example, configurations without an internal ROM, as shown in FIG. 4). Typically, a program which has been examined by a post-development review is fixed in an internal or external mask ROM when the chip is manufactured.

On the other hand, data need be written on or erased from the program ROM during post-development review. Therefore, an internal-EPROM (erasable and programmable ROM)-type enabling write and erase (for example, the ROM 5-1 in FIG. 1 is regarded as an EPROM) or a ROMless-type in which the internal ROM is removed and an external EPROM and RAM are attached (for example, the configurations shown in FIGS. 4 and 6) is used. In small-volume production, system LSIs of the internal-EPROM-type or ROMless-type may be used as end products, instead of the mask-ROM-type.

In many cases, manufacturers of system LSIs manufacture internal-EPROM-type or ROMless-type products as serialized products associated with internal-mask-ROM-type products. Regardless of whether a program memory is provided inside or outside, a reset vector in the program memory is accessed at power-up reset, and a program is executed from a starting instruction therein.

In some high-performance system LSIs in which the main storage can be externally expanded, modes can be switched between an ordinary operating mode for executing a program in an internal ROM at boot-up (hereinafter referred to as an internal mode) and an operating mode called an external mode. When the external mode is selected, the internal ROM becomes ineffective, and the address space which is laid out in the internal ROM in the internal mode is opened to an external memory.

That is, when the program is booted up in the external mode, a reset vector in the external program memory is accessed and the program is executed from the starting instruction therein, as in the above-described ROMless-type. For example, in the configurations shown in FIGS. 2 and 3, the ROM 5-2 or 5-3 is not accessed but the external RAM 21 is accessed.

Therefore, in some cases, post-development review of a program is performed in the external mode, and after the program has been completed, the program is fixed in the internal ROM so as to be operated in the internal mode.

On the other hand, in the ROMless-type, when a PROM (programmable ROM) is used in which the external ROM cannot be rewritten or when rewriting is difficult to perform, a memory-mapping conversion circuit is connected to an external bus, so that the above-described internal/external mode switching can be realized (for example, switching can be realized in the configuration shown in FIG. 5).

Now, the software development environment for the system LSIs 1-1 to 1-6 will be described (in the following description, when the system LSIs 1-1 to 1-6 need not be distinguished from each other, they will be referred to just as a system LSI 1, and this is the same for the other parts).

Programming is typically performed using an assembler language or a compiler language. A source program is converted to an object program according to the model by using a cross-assembler or a compiler operated in a personal computer.

A developed program is tested and debugged under the control of a host computer by using a target monitor, an ICE (in-circuit emulator), an IDE (integrated development environment) debugger, and so forth. These development tools are provided from manufacturers or a third party according to each model of the system LSI 1.

In the system LSI 1, an entire main program which is logically sequential from a starting instruction (entry point) executed upon power-up reset is created, different from the development of an application program incorporating an operating system, such as UNIX®. Of course, the main program is developed by using many relocatable subroutines. Eventually, the subroutines are linked to one another by a cross-assembler or a compiler, so that an absolute-format main program, in which the starting instruction is set to the reset vector of the program memory, is created.

A computer system must have some unit for starting execution of a program after a cold start. Usually, the hardware architecture of the CPU 2 includes a reset function for setting all hardware circuits at a known electrical state. However, the CPU 2 needs to be allowed to start a desired program.

For example, some computer systems are configured so as to read a "bootstrap" or "bootstrap loader" program and a "BIOS" program at startup. A bootstrap program is a simple program for loading a command of another sequence at the top of a desired application program and starting execution of the sequence. The bootstrap program is sometimes referred to simply as "boot" software.

For example, in an Intel® 80x86 microprocessor from Intel Corporation, execution of a program is started from a specific memory address after hardware reset. That is, the microprocessor reads the contents at the memory position (address), and tries to execute bits detected there as a microprocessor instruction.

The specific memory position used by the 80x86 family is XXXFFFF0h, that is, the top 16 bits in the memory space. In another microprocessor, a different starting address can be used, but the same principle can be applied. Therefore, when the microprocessor finds a branch (or conditional branch) instruction in this address, it continues execution of the program regardless of the address specified. Therefore, this initial target address serves as an entry point for every usage session, and it will be referred to as a reset vector in the following description as needed.

Usually, this reset vector has to be executed every time a computer is used, and the entry point of the bootstrap is allocated to the reset vector.

As shown in FIGS. 1 to 6, various configurations including a system LSI 1 can be realized. These configurations are required by considering the software development environment. However, the following problems arise when the system LSI takes various forms. An object of the present invention is to provide a method for solving the problems. Hereinafter, the present invention will be further described together with the problems to be solved.

First, what can be realized by the present invention will be described. By applying the present invention, an ultra-compact and inexpensive system LSI including many peripheral circuits may be operated in a personal-computer-like environment, and a computer apparatus can be realized which can read various application programs from a large-capacity auxiliary storage device, such as a flash memory, memory card, or floppy disk, so as to execute the programs.

The above-described main program in the absolute-format created by an existing development tool dedicated for the system LSI 1 to be used can be used as-is as an application program.

In addition, the two boot methods, autonomous boot and heteronomous boot, can be used without changing the program. In the autonomous boot, the application program autonomously boots up from the ROM 5 inside the system LSI 1, as in the configurations shown in FIGS. 1 to 3. In the heteronomous boot, a ROMless-type in which the system LSI 1 does not include a ROM or the external mode is used, the application program heteronomously boots up by copying the firmware to the RAM under the control of an external host or debugger.

Under this condition, the application can be developed from a stage before the device used for the program memory and the boot memory area of the system LSI 1 is determined. Additionally, the code used at the development can be used as-is for products without modifying it. In this way, by applying the present invention, codesign of the system LSI 1 and the application can be seamlessly performed.

When the ROM 5 is used as the boot memory area, the ROM 5 must be rewritten or a ROM ICE must be used in order to change the firmware. In particular, when an EPROM is incorporated, the ROM ICE cannot be used, and thus a complicated task of rewriting the contents of the ROM 5 must be performed. However, by applying the present invention, the heteronomous boot can be used without modifying the firmware. Accordingly, it becomes possible to flexibly respond to frequent changes in a firmware image, such as correction of the initialization code of the firmware and device at set development.

These functions may be realized in the following way as an extension of a typical use of the system LSI without applying the present invention, which will be described with reference to a flowchart and so forth. However, this approach has problems and is not practical. Now, the function realized as an extension of a typical use of the system LSI and the problems thereof will be described in order to clarify the difference from the present invention and to explain the advantages of the present invention.

For example, a high-performance system LSI in which the memory and I/O unit can be externally expanded is used as hardware. A considerable-capacity RAM is attached thereto so as to expand the main storage (the attached main storage RAM is regarded as an external RAM), and a flash memory or the like is coupled thereto as a nonvolatile large-capacity auxiliary storage device (for example, the configuration shown in FIG. 2 is obtained).

A system program having an operating system (OS) function is stored in a ROM inside a one-chip micon. As used herein, "OS function" means a function of reading an application program from the auxiliary storage device and transferring it to the external RAM, and then jumping to the application program on the external RAM. Hereinafter, this function is referred to as an application program loader as necessary.

In the above-described configuration, the application program is stored in advance in a predetermined area of the auxiliary storage device by another process. When the power of the system LSI is turned on, the system program in the internal ROM is executed from the reset vector (0 address) and a necessary initialization routine is executed. Then, the application program loader is executed automatically (as a continuous operation) or by receiving an instruction signal from the outside.

After this process, the predetermined application program in the auxiliary storage device is transferred to the external RAM, and the process jumps to the application program on the external RAM automatically or in accordance with the instruction signal from the outside. Accordingly, the application program is executed. The application program may have a function of returning to the system program as needed.

In this system, however, the internal ROM is stored in a predetermined area continued from the 0 address (reset vector address) in the address space of the CPU (the starting instruction of the system program is set to the 0 address). Of course, the position in the address space in the CPU of the application program, which is transferred from the auxiliary storage device to the external RAM by executing the application program loader in the system program, is not a storage area for the system program (internal ROM area) but is the external expanded area (external RAM area).

That is, the application program is written in an x address or thereafter of the external expanded area, and the application program is executed by jumping to the starting instruction which is set to the x address.

Therefore, the application program must be created in a relocatable format in which the position in the main storage is not specified or in an absolute format in which the starting instruction is set to a specific x address other than the 0 address, not in an absolute format in which the starting instruction is set to the 0 address. When an application program in the relocatable format is created, the application program created by a dedicated development tool, which is prepared for each model of the system LSI, cannot be used as-is.

It is, of course, possible to create an arbitrary application program in the relocatable format which is normally operated at an arbitrary x address or thereafter. However, a program created by using a development tool dedicated for each one-chip micon supplied from a manufacturer cannot be used as-is. In order to use the program, all address-related information in the program must be modified. It is very difficult to accurately perform this process on the entire application program, and the process requires an immense amount of time.

By modifying or newly creating a development tool, a program which can be normally operated at an arbitrary x address can be created. However, it is not practical for a user of the system LSI to create a development tool, which needs much time, and the problem cannot be solved. Further, it is also impossible for the above-described reason to store programs for system LSI which have been created by an existing development tool and which have usage track records in a library so as to reuse the programs as an application program. This causes a decrease in convenience and in the developing ability of an application program, which is not preferable.

On the other hand, an application program of the absolute format, in which the starting instruction is set to a specific x address other than the 0 address, can be created by using many types of development tool. However, in this case, too, a program under development must be modified in order to commercialize it. Also, the size must be estimated and an examination must be performed again, which is inefficient.

For example, in many cases, a program is developed by using the ROMless-type in an early stage, but the type may be changed to the internal-EPROM-type or the internal-mask-ROM-type during development. In such a case, if an application program is created in the absolute format, in which the starting instruction is set to a specific x address other than the 0 address, the layout of the application program must be changed in accordance with a change in the layout of the ROM area serving as a boot memory area. Therefore, in an execution file, unexpected changes are added: a change in a branch-destination address, the addition of a code used for copying data from ROM to RAM, and a change in the layout order. Thus, examination and evaluation of the performance must be performed again.

However, by applying the present invention, which will be further described below, these problems can be solved and the above-described object can be achieved.

Hereinafter, a method for booting up the application (bootstrap process) of the present invention will be described with reference to the flowchart shown in FIG. 7. First, general outlines will be briefly explained, and then the operation in each of the configurations shown in FIGS. 1 to 6 will be explained in detail.

In step S11, the execution is started from the entry point. In step S11, the execution is started from the entry point (Reset) of a bootstrap (hereinafter referred to as an ordinary process). Further, two other processes may be optionally performed (hereinafter referred to as an "option", meaning that they are not necessarily performed but may be performed as required).

In a first option (hereinafter referred to as option 1), the execution may be started from the entry point of the bootstrap after jumping to a non-cache RAM area (0xA0000000). This method can be realized by locating a code for jumping in a boot area. The process of option 1 is required when an ICE or the like is not provided and a PC (program counter) cannot be changed.

In a second option (hereinafter referred to as option 2), the execution may be started from the entry point of the bootstrap after jumping to the non-cache RAM area (0xA0000000) This method can be realized by setting the PC to the non-cache RAM area (0xA0000000). The process of option 2 is required when a host CPU is not provided but an ICE is provided.

As a prerequisite for performing step S11, the entire program including the bootstrap must be loaded in the ROM area or programmed in the ROM in advance. However, when the above-described option 1 or 2 is performed, the entire program must be loaded in the RAM area, not in the ROM area.

Further, options 1 and 2 are not performed in the bootstrap body (need not be performed in the bootstrap body). Therefore, the processes of options 1 and 2 are not shown in the flowchart in FIG. 7. Hereinafter, cases where the process of option 1 or 2 can be performed and cannot be performed will be described.

First, a case where the process can be performed will be described. The process can be performed when the reset vector and the program area are mapped to different addresses in the (different or same) physical device. This method is used for performing high-speed boot or omitting complicated programming to the ROM area. If these purposes need not be satisfied, the process is started from the original reset vector of the CPU (CPUs 2-1 to 2-6 in FIGS. 1 to 6). That is, the above-described ordinary process (not option 1 or 2) is performed.

On the other hand, the process cannot be performed when the reset vector and the program area are mapped to the same physical device and when the two areas are mapped to the same address on the physical device. In such a case, the process endlessly jumps, and thus the process of option 1 or 2 must not be executed. That is, the process must be started from the original reset vector of the CPU 2 (the above-described ordinary process).

The present invention can be applied to a case where the reset vector and the program area are mapped to the same physical device.

In step S12, the process jumps to the bootstrap body (_reset). In step S12, one of two processes is selected by conditional compile in the program according to whether the reset vector and the program area are physically overlapped.

In one of the two processes, when the reset vector and the program area are not physically overlapped, a PC relative address branch instruction is used so as to prevent a jump to a segment in virtual address space to which the execution is linked. That is, the process jumps to PC+0x400.

In the other process, when the reset vector and the program area are physically overlapped, an absolute address branch instruction is used, so that the process jumps to a non-cache segment in the virtual address space to which the execution is linked, that is, jumps to the non-cache RAM area (0xA0000400).

In step S13, the CPU 2 is initialized. Step S13 includes CPU configuration (config), SW interrupt clear (cause), CPU timer initialization (compare), prohibition of interrupt, and BEV=1 (cause).

In step S14, a data cache is initialized. Then, in step S15, it is determined whether the process is being executed on the cache RAM. When it is determined that the process is being executed on the cache RAM in step S15, the process proceeds to step S21. Otherwise, the process proceeds to step S16.

In step S16, an instruction cache is initialized. In step S17, it is determined whether the process is being executed on the non-cache RAM. When it is determined that the process is being executed on the non-cache RAM in step S17, the process proceeds to step S21. Otherwise, the process proceeds to step S18.

Steps S16 and S17 are performed in the non-cache ROM or non-cache RAM.

In step S18, it is determined whether the ROMless-type or the external mode is used. The determination in step S18 eventually determines whether the process is performed on the ROM 5 in the system LSI 1. When it is determined that the ROMless-type or external mode is used in step S18, the process proceeds to step S20. On the other hand, when it is determined that the mode is neither the ROMless-type nor the external mode (that is, the internal mode is used), the process proceeds to step S19.

In step S19, a DRAM (dynamic RAM) controller is initialized. Step S19 is not performed when it is determined that the ROMless-type or the external mode is used in step S18. However, the CPU 2 needs to determine the mode when the ROMless-type or the external mode is used.

In step S20, data is copied from the ROM to the RAM. The data to be copied includes a program code (.text) and C/C++ initialization data (.rodata.data,.sdata). There are two methods for copying the data in step S20, and each method can be specified by a preprocessor macro.

In a high-speed method, the RAM as a copy-destination is used as a cache area (with flash), and in a general method, the RAM as a copy-destination is used as a non-cache area (default).

In step S21, a process for jumping to the cache RAM area is performed. Step S21 and thereafter are performed in the cache RAM. Then, in step S22, a stack and data are initialized. More specifically, a GP register, a stack area, and a stack pointer register are initialized. Also, C/C++ non-initialized data (.sbss, .bss) is initialized at 0.

Initialization of the stack area is omitted in default, but it may be performed for debug. Also, initialization of the C/C++ non-initialized data (.sbss, .bss) at 0 can be omitted when the .sbss, .bss area is 0-initialized before executing this bootstrap.

In step S23, a vector for exception or interrupt after bootstrap is set. Then, in step S24, a heap area is initialized at 0. In step S25, a constructor and initializer for a global variable of C++ are executed. In step S26, the entire data cache is flushed.

The entire instruction cache is cleared in step S27, the bootstrap is ended (BEV=0) and interrupt is permitted in step S28, and a kernel is initialized or a jump to the main is performed in step S29.

The bootstrap process is performed in the above-described way. The structure of the application program (execution file) for executing this bootstrap process will be described with reference to FIG. 8.

An execution file 51 includes a bootstrap unit 52 and an application unit 53. The bootstrap unit 52 includes a relocatable code unit 54 and a nonrelocatable code unit 55. The application unit 53 includes a nonrelocatable code unit 56. Incidentally, both the relocatable code and nonrelocatable code may be compiled in the absolute format.

The relocatable code unit 54 of the bootstrap unit 52 includes an entry point 57, jump-access codes 58 and 59, a subroutine in bootstrap 60, and a jump code 61.

The entry point 57 includes a reset vector (LMA) and data at the top of the RAM area (VMA). The jump-access code 58 is used for resolving an address in the bootstrap unit 52 by PC (program counter) relative and jumping to and accessing the address. The jump-access code 59 is used for resolving an address outside the bootstrap unit 52 and jumping to and accessing the address.

In order to resolve an address outside the bootstrap unit 52 by the jump-access code 59, a JAL ( ) macro and an LA ( ) macro are used. The JAL ( ) macro can be represented by the following Equation 1 or 2.

$$\text{jump\_adr\_ads} = \text{VMA}(\text{jump\_adr}) - \text{VMA}(\text{PC}) + \text{PC} \quad \text{JAL}(\text{jump\_adr}) = \text{JUMP}(\text{jump\_adr\_ads}) \quad \text{Equation 1}$$

In Equation 1, VMA ( ) indicates finding a virtual memory address and JUMP ( ) indicates an absolute address branch instruction.

$$\text{jump\_adr\_ads} = \text{VMA}(\text{jump\_adr}) - \text{VMA}(\text{entry\_adr}) + \text{LMA}(\text{entry\_adr}) \quad \text{JAL}(\text{jump\_adr}) = \text{JUMP}(\text{jump\_adr\_ads}) \quad \text{Equation 2}$$

In Equation 2, VMA ( ) and JUMP ( ) have the same meaning as in Equation 1, and LMA ( ) indicates finding a load memory address.

The JAL ( ) macro is used for calculating a jump-destination address jump_adr_ads by Equation 1 or 2 and for jumping in accordance with the absolute address branch instruction.

The LA ( ) macro can be represented by the following Equation 3 or 4.

$$\text{Load\_adr\_ads} = \text{VMA}(\text{load\_adr}) - \text{VMA}(\text{PC}) + \text{PC} \quad \text{LA}(\text{reg, load\_adr}) = \text{LOAD}(\text{reg, load\_adr\_ads}) \quad \text{Equation 3}$$

In Equation 3, VMA ( ) indicates finding a virtual memory address. LOAD ( ) indicates an absolute address load instruction.

$$\text{Load\_adr\_ads} = \text{VMA}(\text{load\_adr}) - \text{VMA}(\text{entry\_adr}) + \text{LMA}(\text{entry\_adr}) \quad \text{LA}(\text{reg, load\_adr}) = \text{LOAD}(\text{reg, load\_adr\_ads}) \quad \text{Equation 4}$$

In Equation 4, VMA ( ) and LOAD ( ) have the same meaning as in Equation 3, and LMA ( ) indicates finding a load memory address.

The LA ( ) macro is used for calculating a load address load_adr_ads by Equation 3 or 4 and for loading the contents of the memory to a specified register in accordance with a load instruction.

Figure 8:
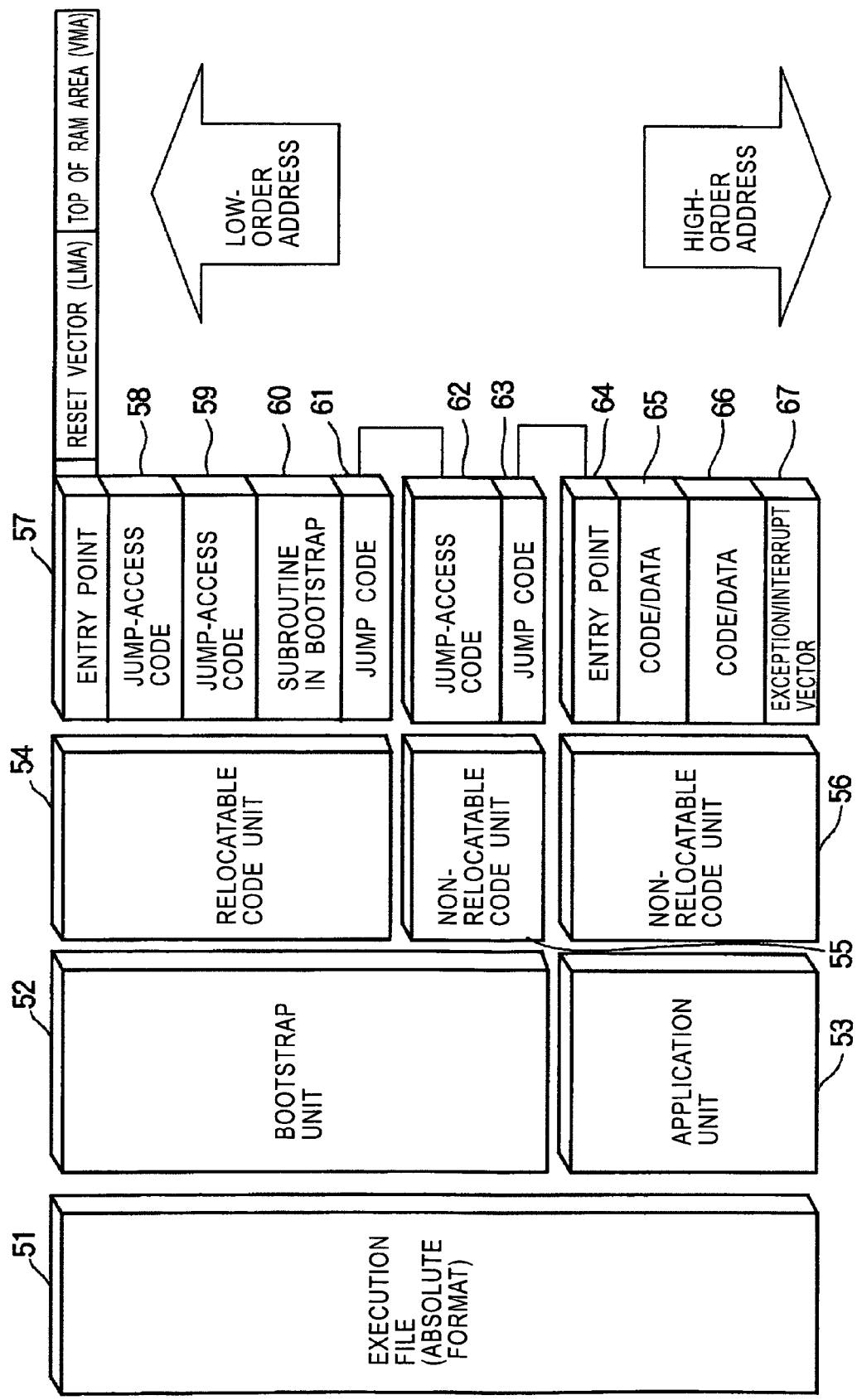
FIG. 8 illustrates an execution file.

A function repeatedly performed in the bootstrap unit 52 is written in the subroutine in bootstrap 60 (FIG. 8). Also, a code for jumping to a jump-access code 62 of the nonrelocatable code unit 55 of the bootstrap unit 52 is written in the jump code 61.

In the relocatable code unit 54 including these pieces of data, a branch instruction is coded so that all the codes can be relocated at least in steps S11 through S21. Also, in branch, function call, and reference to symbol inside the bootstrap body (crt0.s), the PC relative address branch instruction is used as described above.

In function call and reference to symbol outside the bootstrap body (crt0.s), all external symbols and functions serve as a link address. Accordingly, in the relocatable code unit 54, the offset of an execution address and a link address is added so as to perform branch and reference to symbol. The above-described JAL ( ) macro and LA ( ) macro are used for realizing this function.

The process after step S21 (jump to the cache RAM area) is performed by the nonrelocatable code. Therefore, in order to enter this area, the absolute address branch instruction must be used in order to jump thereto. The above-described jump code 61 is used for performing this process.

Referring back to FIG. 8, the nonrelocatable code unit 55 of the bootstrap unit 52 includes the jump-access code 62 and a jump code 63. The jump-access code 62 is used for resolving an address outside the bootstrap unit 52 by VMA (valid memory address) so as to jump to and access the address. The jump code 63 is used for jumping to the application unit 53.

In the nonrelocatable code unit 55, programming can be performed with an ordinary language, such as C language, C++ language, or assembler language.

The nonrelocatable code unit 56 of the application unit 53 includes an entry point 64, code/data 65 and 66, and exception/interrupt vector 67. The entry point 64 is a jump destination by the jump code 63.

The code/data 65 is code and data called from the bootstrap unit 52, and the code/data 66 is code and data which are not called from the bootstrap unit 52. The exception/interrupt vector 67 is data about a process which is exceptionally performed during a predetermined process, for example, when something abnormal occurs.

Figure 7:
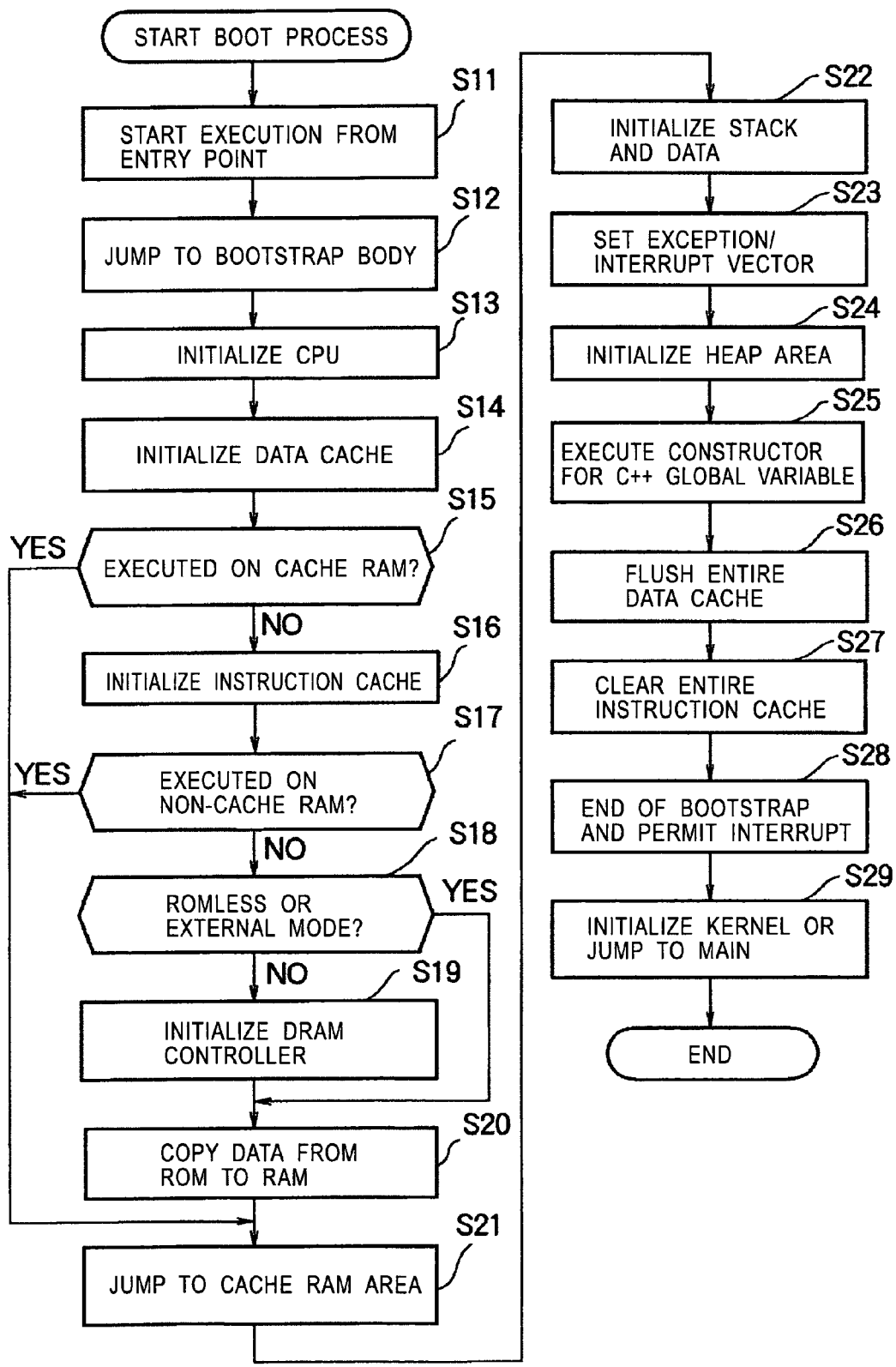
FIG. 7 is a flowchart illustrating a boot process.

The process illustrated in the flowchart shown in FIG. 7 is performed by the program having such a configuration. Now, the features of the process will be described. First, cache coherence will be described. In order to keep cache coherence, the instruction cache for a corresponding part need be cleared immediately after step S20 in FIG. 7. In the flowchart shown in FIG. 7, the clearing is to be performed between steps S20 and S21. However, since initialization is preformed in step S16, the same process need not be repeated between steps S20 and S21.

Likewise, cache coherence must be kept after the process of copying the exception/interrupt vector in step S23. However, an exceptional process and an interrupt process are not performed until the bootstrap has been finished. Therefore, flushing the data cache in step S26 and clearing the instruction cache in step S27 are performed after step S25.

Also, flushing the data cache in step S26 serves as a process for reliably writing data on the RAM, as in steps S22, S24, and S25 (multiprocessor-compatible, which will be describe later).

Next, multiprocessor-compatible will be described. If only one CPU is taken into consideration, flushing the entire data cache performed in step S26 is not required for part except the part related to the above-described cache coherence (steps S22, S24, and S25). However, considering a case where these data parts are shared with another CPU, the cache is flushed in order to reliably write data.

Next, a method for creating a load image of the application will be described. First, an execution file will be described. The application program and bootstrap of a target user must be compiled and linked as a single execution file, as shown in FIG. 8. Generally, this execution file is in an ELF/DWARF format. However, another format may be used as long as an ICE and a host debugger may be used.

Hereinafter, a link address of the execution file will be described. The application program of the target user is linked with an address which is to be actually executed (generally, the address to be executed is referred to as VMA: virtual memory address), and is laid out (generally, the laid out address is called LMA: load memory address). However, only the area in the execution device and execution environment of the application is effective.

Next, conversion to a load image will be described. A file of a load image may be in a Motorol-S format, but another format may be used as long as an ICE and a host loader can be used. When the Motorol-S format is used, the execution file (ELF/DWARF format) is converted to a load image.

If a target application program is placed in the ROM area or the non-cache RAM area, a load image file in the Motorol-S format or ELF/DWARF format is created, to which an offset value is added so that the entry point is mapped to the area.

If the target application program is placed in the cache RAM area, a load image file in the Motorol-S format or ELF/DWARF format is created, to which an offset value is added so that the entry point is mapped to the corresponding non-cache RAM area. This process is performed to reliably load the application program to the RAM regardless of the state of the cache at loading.

When the execution environment requires another format, the file created in the Motorol-S format or ELF/DWARF format is further converted to another format and is used. For example, when VCS is used, the file may be converted to a dat format as necessary.

Next, a process performed before load is described. When the application program is booted up from the cache RAM or the non-cache RAM and when the DRAM has to be initialized, the DRAM is initialized from the outside before load. Then, the entire application program is loaded to the boot area for the above-described entire load image. This is the same for the case where boot-up is performed from the non-cache ROM area.

When the application program is booted up from the cache or non-cache RAM, the load image file created in the above-described method, for example, a file in the Motorola-S format or the like can be used. A load address (LMA) and the application program and bootstrap to be loaded are included in the file.

The substance for performing load may be any of a main host debugger using a host CPU, ICE, or JTAG-ICE, and a loader in a simulation environment (readmemh of VCS).

After the load has been performed, if a symbolic debug is performed by using a debugger, a symbol is loaded from the execution file.

Next, a method and device for executing the application will be described. When the application is executed from reset (normal process), reset of the CPU is released as usual and the execution by the CPU is started.

When the execution is controlled by a device other than the main host debugger (in option 1), that is, when the execution is performed by another host debugger, host CPU, or VCS, a jump code to the address of the loaded entry point is placed on the reset vector of the main CPU, and then the execution by the CPU is started. For example, in a case of the non-cache RAM, li t0, 0xA0000000jr t0nop.

When the execution is controlled by the main host debugger (in option 2) and when the ICE and JTAG-ICE are used, the PC is set to the address of the loaded entry point before executing the program, and then execution by the CPU is started.

Regarding a routine process and automatization (without a special process, particularly, a process in the user side), a method for creating a load image of the bootstrap can be automated by using Makefile. Also, when main/another host debugger is used, load and execution of the bootstrap can be automated by using a batch processing function of the ICE.

FIG. 9 shows boot conditions. In FIG. 9, "R" represents "recommended", "P" represents "boot is possible", "F" represents "flush of cache is required", and "I" represents "boot is impossible".

Next, the process in the flowchart shown in FIG. 7 will be further described with reference to FIGS. 10 to 15. In FIGS. 10 to 15, a ROM area and a RAM area are simulated, and a process of transmitting/receiving data between these areas is illustrated while associating the process with each step in the flowchart shown in FIG. 7. Each of the ROM area and RAM area has 8 MB, for example. In these figures, addresses in [ ] indicate logical addresses, and the other addresses indicate physical addresses.

Figure 10:
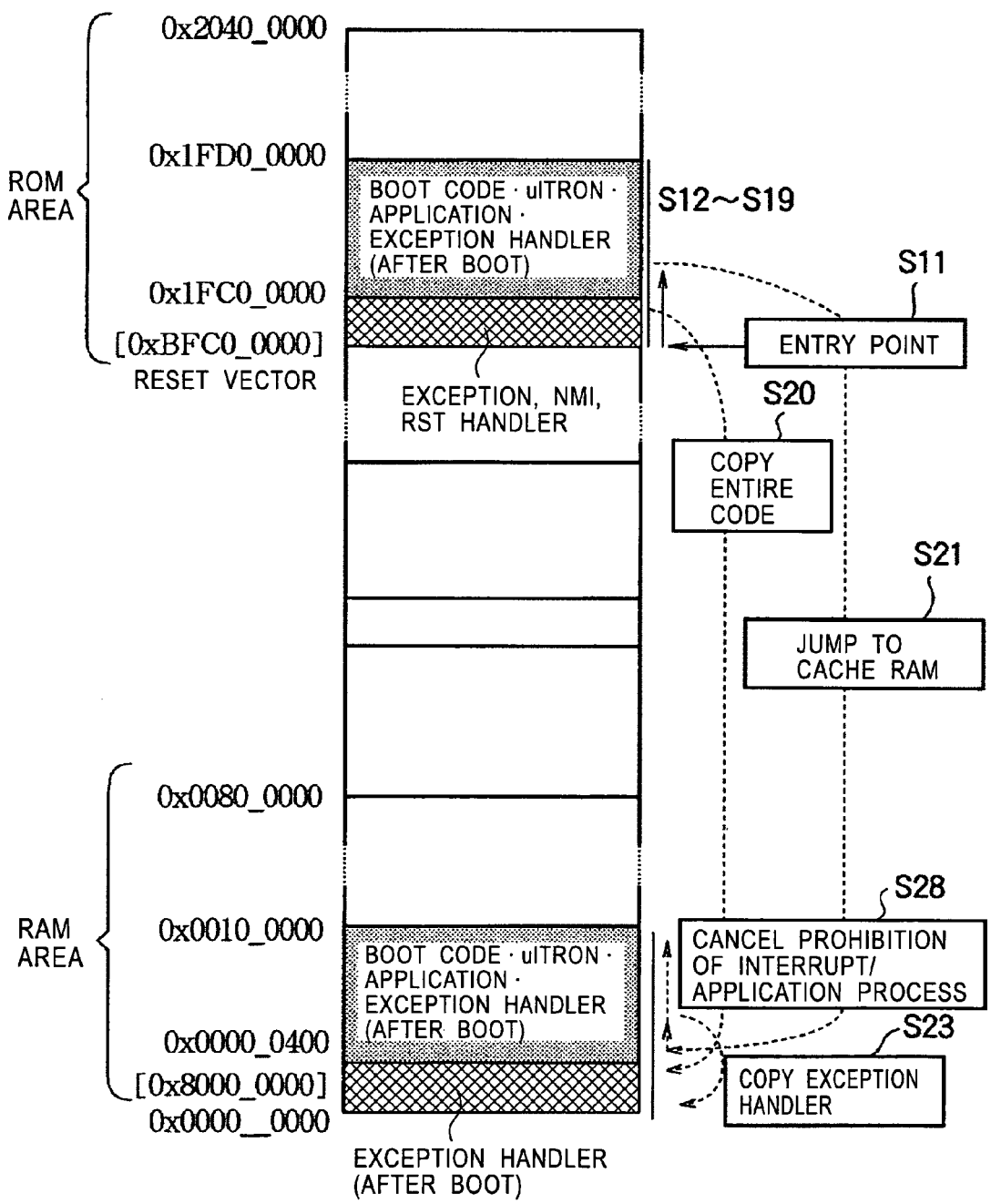
FIG. 10 illustrates the boot process.

FIG. 10 shows a case where the process is started from a normal process, that is, where the process is started from the entry point of the bootstrap, in step S11 (FIG. 7) by autonomous boot in the system having the configurations shown in FIGS. 1 to 5. The ROM area in FIG. 10 corresponds to the ROMs 5-1 to 5-3 in FIGS. 1 to 3 and the external ROM 22 in FIGS. 4 and 5. Also, the RAM area in FIG. 10 corresponds to the RAMs 3-1 to 3-5 in FIGS. 1 to 5.

In step S11, the process is started from the entry point of the ROM area. Then, the process from steps S12 through S19 are sequentially performed in accordance with the program in the ROM area, and in step S21, the program in the ROM area is copied to the RAM area. Then, the process is performed in accordance with the program copied to the RAM area.

Figure 11:
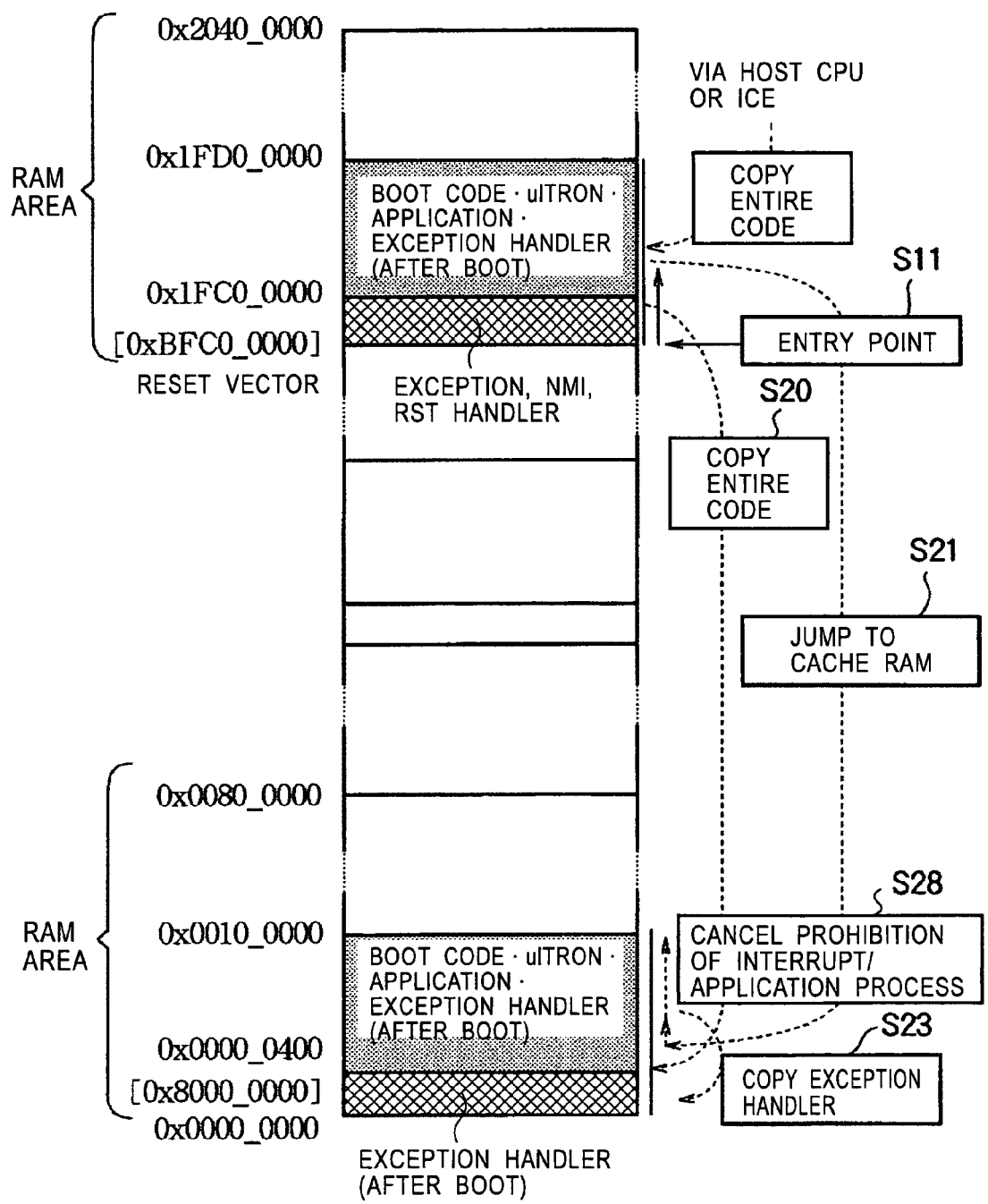
FIG. 11 illustrates the boot process.

FIG. 11 shows a case where the process is started from the normal process, that is, where the process is started from the entry point of the bootstrap by heteronomous boot in the system of the configuration shown in FIG. 3, 5, or 6, in other words, in the system where the reset vector is configured as a RAM area which does not overlap with the program area.

In FIG. 11, the RAM area in the upper side corresponds to the external RAM 13 in FIGS. 3, 5, and 6, and the RAM area in the lower side corresponds to the RAMs 3-3, 3-5, and 3-6 in FIGS. 3, 5, and 6. FIG. 11 shows a state before step S11 is performed, where the entire code is copied from the host CPU (host computer 11) or the ICE 32 to the external RAM 21.

In this way, step S11 and thereafter are performed in the same manner as in FIG. 10 according to the code copied to the external RAM 21. The difference between the states shown in FIGS. 10 and 11 is the applied boot method: autonomous boot or heteronomous boot. In the autonomous boot, the process is started from a state where the entire code is stored in the ROM 5 inside the system LSI 1, whereas, in the heteronomous boot, the process is started from a state where the entire code is stored in the external RAM 21 outside the system LSI 1. However, the process performed thereafter is basically the same in both boot methods.

Figure 12:
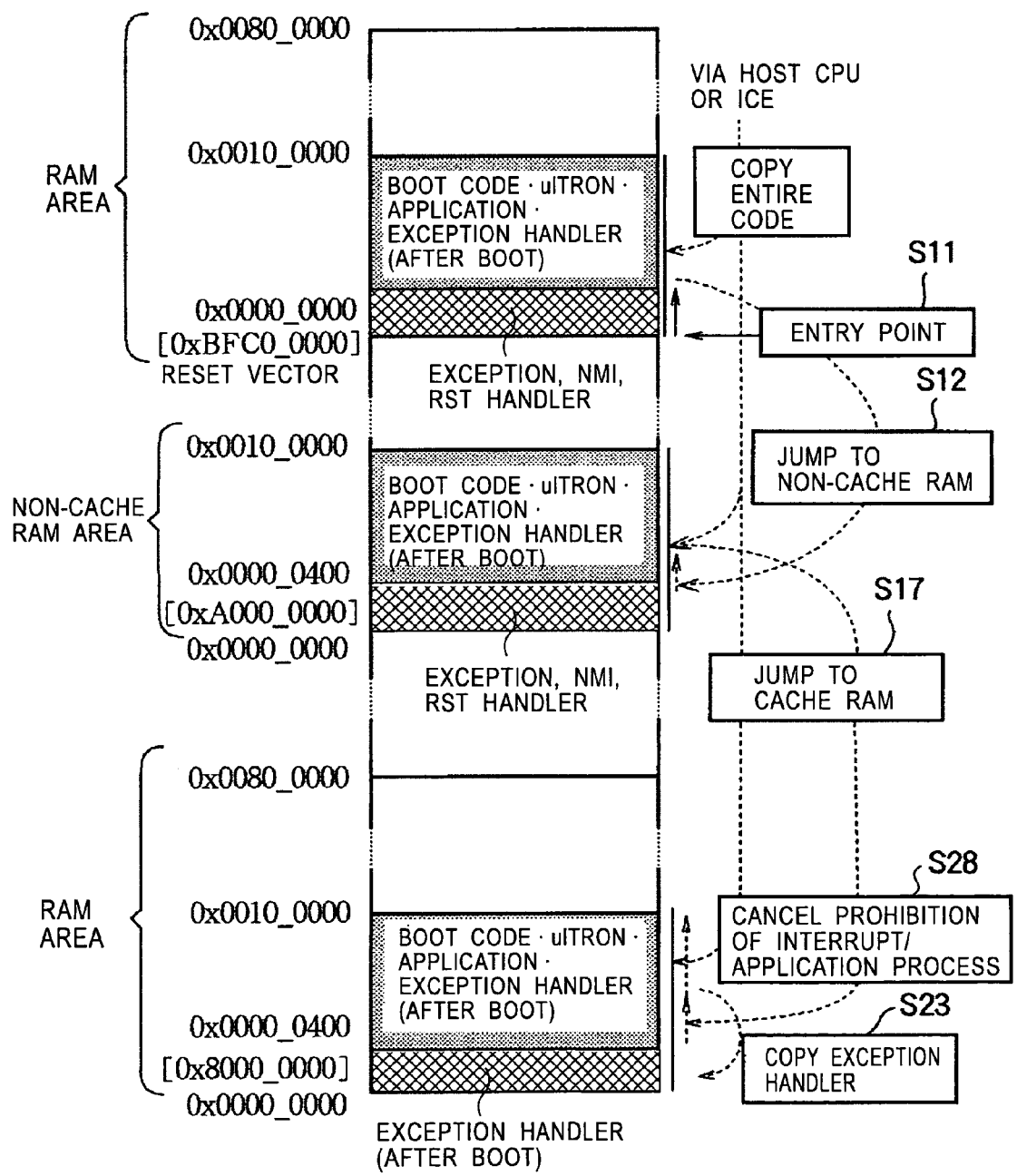
FIG. 12 illustrates the boot process.

FIG. 12 shows a case where the process is started from the normal process, that is, where the process is started from the entry point of the bootstrap by heteronomous boot in the system of the configuration shown in FIG. 3, 5, or 6, in other words, in the system where the reset vector is configured as a RAM area which overlaps with the program area.

In this case, as in FIG. 11, the entire code is supplied from the host CPU or the ICE, and the entire code is copied to each of the RAM 3 area in the system LSI 1, the non-cache RAM area, and the external RAM 21 area. The process is started from the entry point in step S11, and the entry point is set in the RAM area (in this case, the area of the external RAM 21). In step S12, the process jumps to the bootstrap body: the non-cache RAM area in this case.

When the process is performed on the non-cache RAM, it is determined that the process is performed on the non-cache RAM in step S17, so that the process proceeds to step S21. As a result, the process jumps to the cache RAM area, in this case, to the RAM area of the external RAM 21. Then, the process is performed according to the program in the RAM area.

Figure 13:
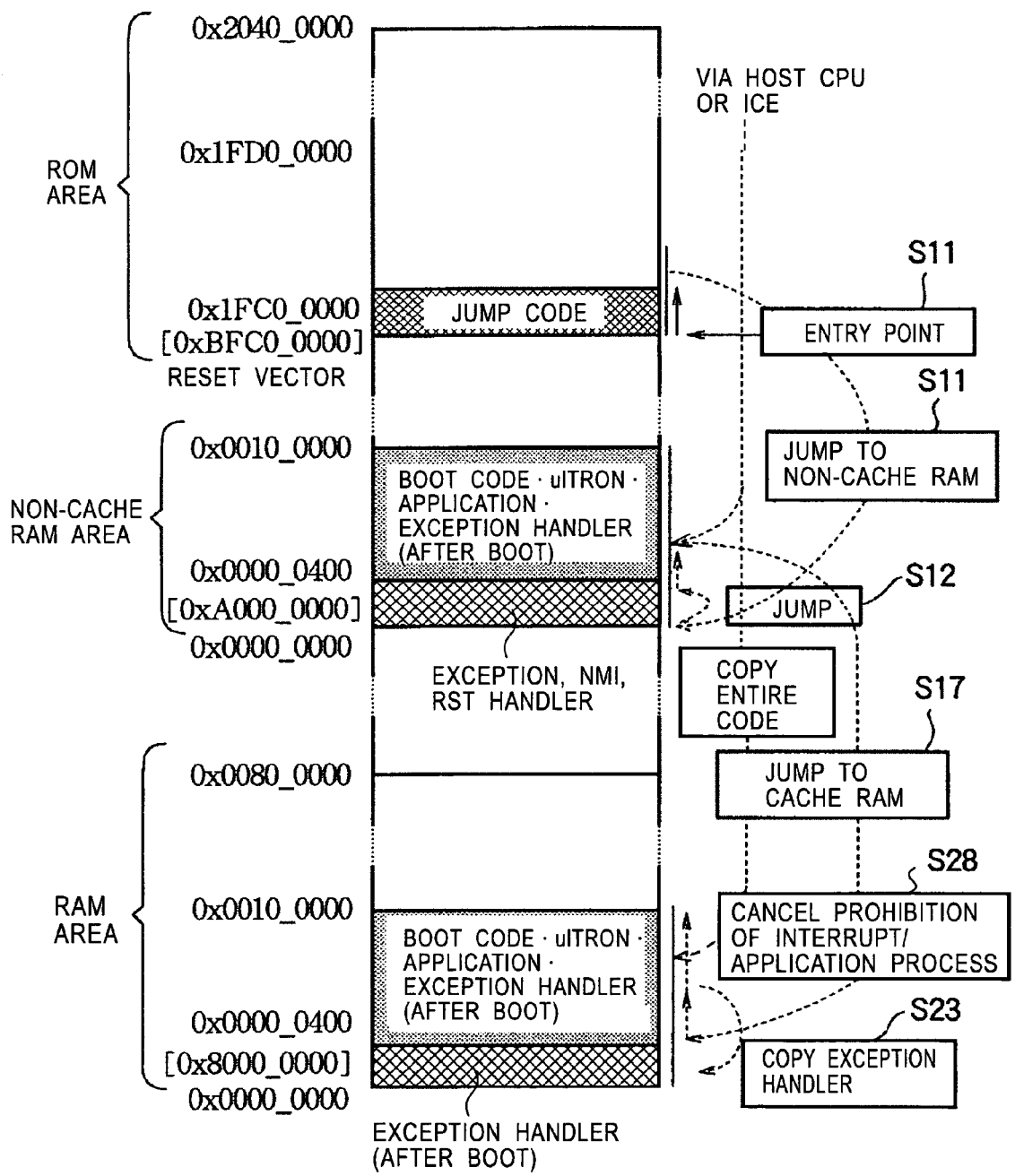
FIG. 13 illustrates the boot process.

FIG. 13 shows a case where the process is started by option 1 by heteronomous boot, that is, where the process is started from the entry point of the bootstrap after jumping to the non-cache RAM area, in the system of the configurations shown in FIGS. 1 to 5. In this case, the ICE 32 or the like is not provided and the PC cannot be changed.

In this case, the process is performed among the ROM area, the non-cache RAM area, and the RAM area. A jump code is stored in the ROM area (ROM 5 in the system LSI 1 or external ROM 22 outside the system LSI 1), the jump code being used for jumping to the non-cache RAM. In this way, a boot can be appropriately performed in both cases where the system LSI 1 includes a ROM and where the system LSI does not include a ROM (ROMless type). Further, a boot process can be smoothly performed in both the external mode and internal mode.

After jumping to the non-cache RAM, the process further jumps to the bootstrap body in step S12. However, since the bootstrap body is in the non-cache RAM area, the jump process is performed within the non-cache RAM. Then, the process is performed as in the state shown in FIG. 12.

Figure 14:
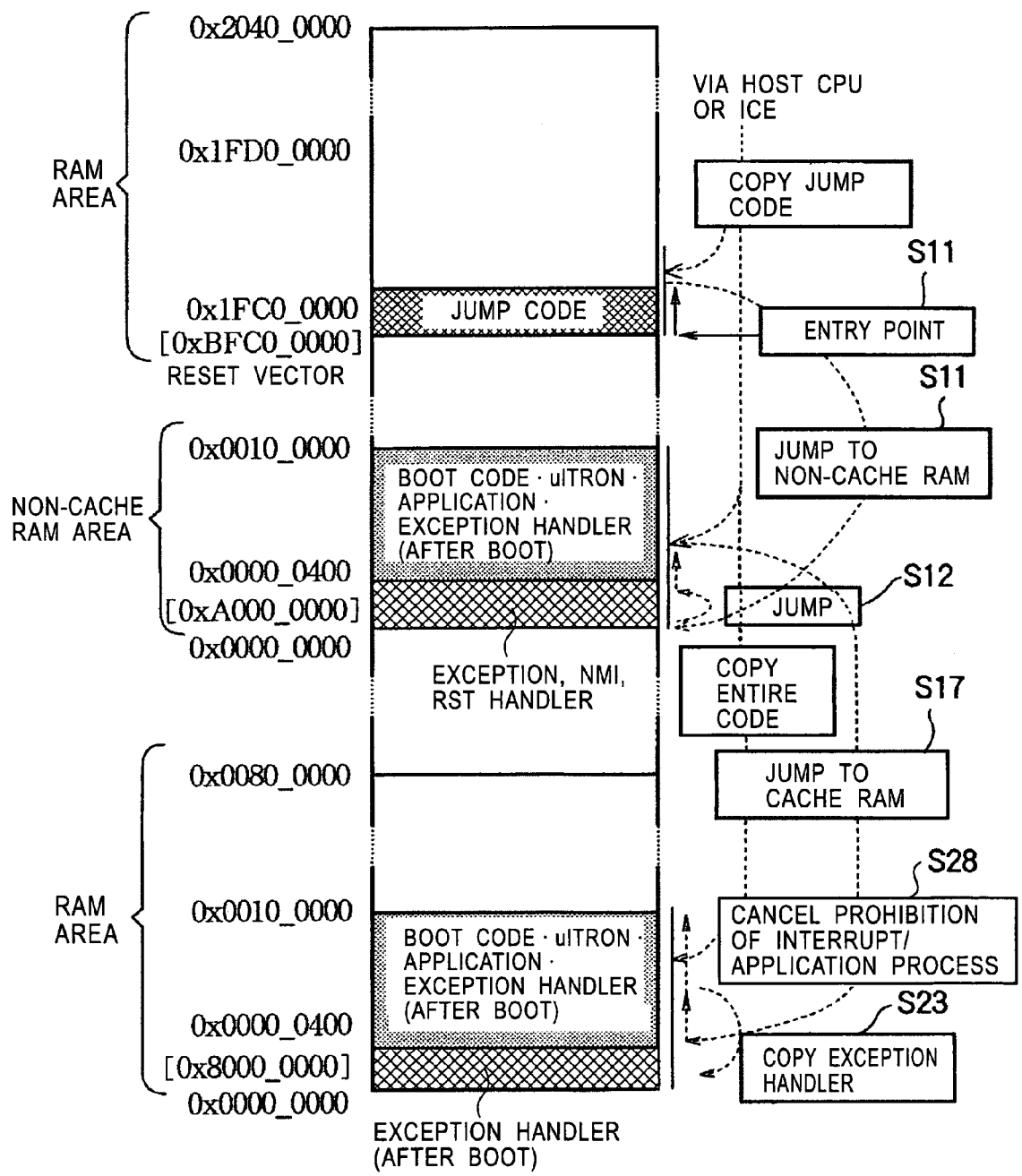
FIG. 14 illustrates the boot process.

FIG. 14 shows a case where the process is started by option 1 by heteronomous boot, that is, where the process is started from the entry point of the bootstrap after jumping to the non-cache RAM area, in the system of the configuration shown in FIG. 3, 5, or 6, in other words, in the system where the reset vector is configured as the RAM area which does not overlap with the program area. In this case, the ICE 32 or the like is not provided and the PC cannot be changed.

In this case, a jump code is copied from the host CPU or the ICE to the external RAM 21 area, and the entire code is copied to the non-cache RAM area and the RAM 3 in the system LSI 1. In the state shown in FIG. 14, the process is performed as in the state shown in FIG. 13 after jumping to the non-cache RAM area according to the jump code copied to the external RAM 21 area.

Figure 15:
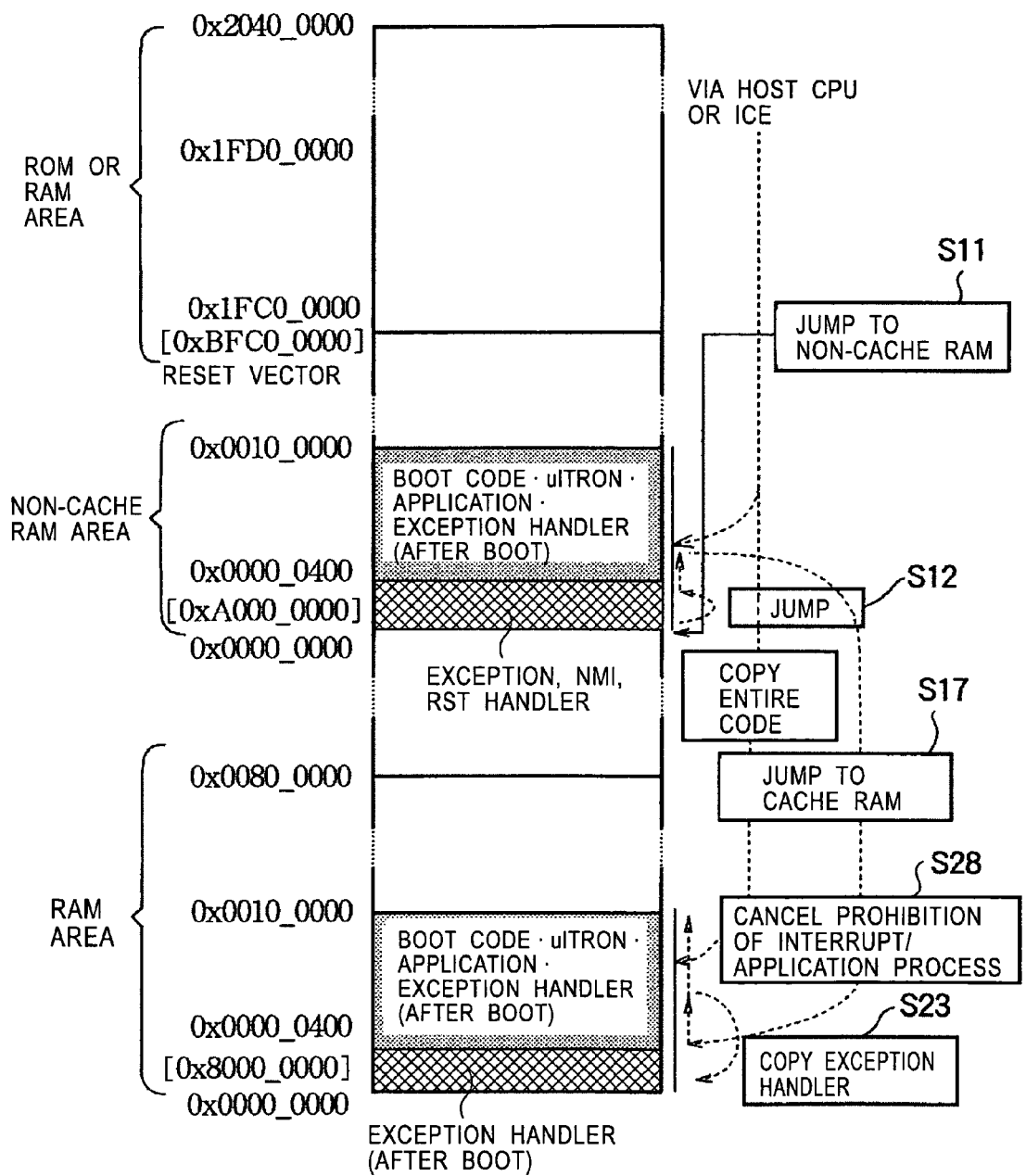
FIG. 15 illustrates the boot process.

FIG. 15 shows a case where the process is started by option 2 by heteronomous boot, that is, where the process is started from the entry point of the bootstrap after jumping to the non-cache RAM area, in the system of the configurations shown in FIGS. 1 to 5, or in the system of the configuration shown in FIG. 3, 5, or 6, in which the reset vector is configured as the RAM area which does not overlap with the program area.

In this case, the entire code is copied from the host CPU or the ICE to the non-cache RAM area and the RAM area.

Then, in step S11, the process is started from the non-cache RAM. After that, the process is performed in basically the same way as in the state shown in FIG. 14.

The above-described boot method has the following advantages. That is, a program in the absolute format can be used as-is as an application program. That is, a main program in the absolute format which has been created by an existing development tool dedicated for the system LSI to be used can be used as an application program.

Further, both heteronomous boot and autonomous boot can be used without modifying the firmware. That is, both boot methods: autonomous boot for autonomously booting up a program from a ROM; and heteronomous boot for heteronomously booting up a program by copying the firmware to the RAM under the control of an external host or debugger in the external mode, can be used in development and commercialization without changing the program.

Also, the firmware can be developed before selecting a device for the boot memory area. That is, an application can be developed from a stage before determining a device for the program memory and the boot memory area of the system LSI. Accordingly, codesign of the system LSI and the application can be seamlessly performed.

Even when a ROM is used as the boot memory area, an ICE is not required and a complicated process of rewriting the ROM is unnecessary. Usually, when a ROM is used as the boot memory area, the ROM must be rewritten or a ROM ICE must be used in order to modify the firmware. In particular, when the internal-EPROM-type is adopted, a ROM ICE cannot be used and thus a complicated process of rewriting the ROM must be performed. However, by applying the present invention, the heteronomous boot can be used without changing the firmware, and a flexible response to frequent change in a firmware image, such as correction of the initialization code of the firmware and device at set development, can be realized.

The program for executing the above-described series of processes may be recorded on recording media, which may be distributed to users. The recording media used in such a case will be described. In order to allow software (program) to execute the series of processes, the program constituting the software is installed through a recording medium into a computer incorporated into dedicated hardware or into a multi-purpose personal computer which can perform various functions by installing various programs thereto.

Figure 16:
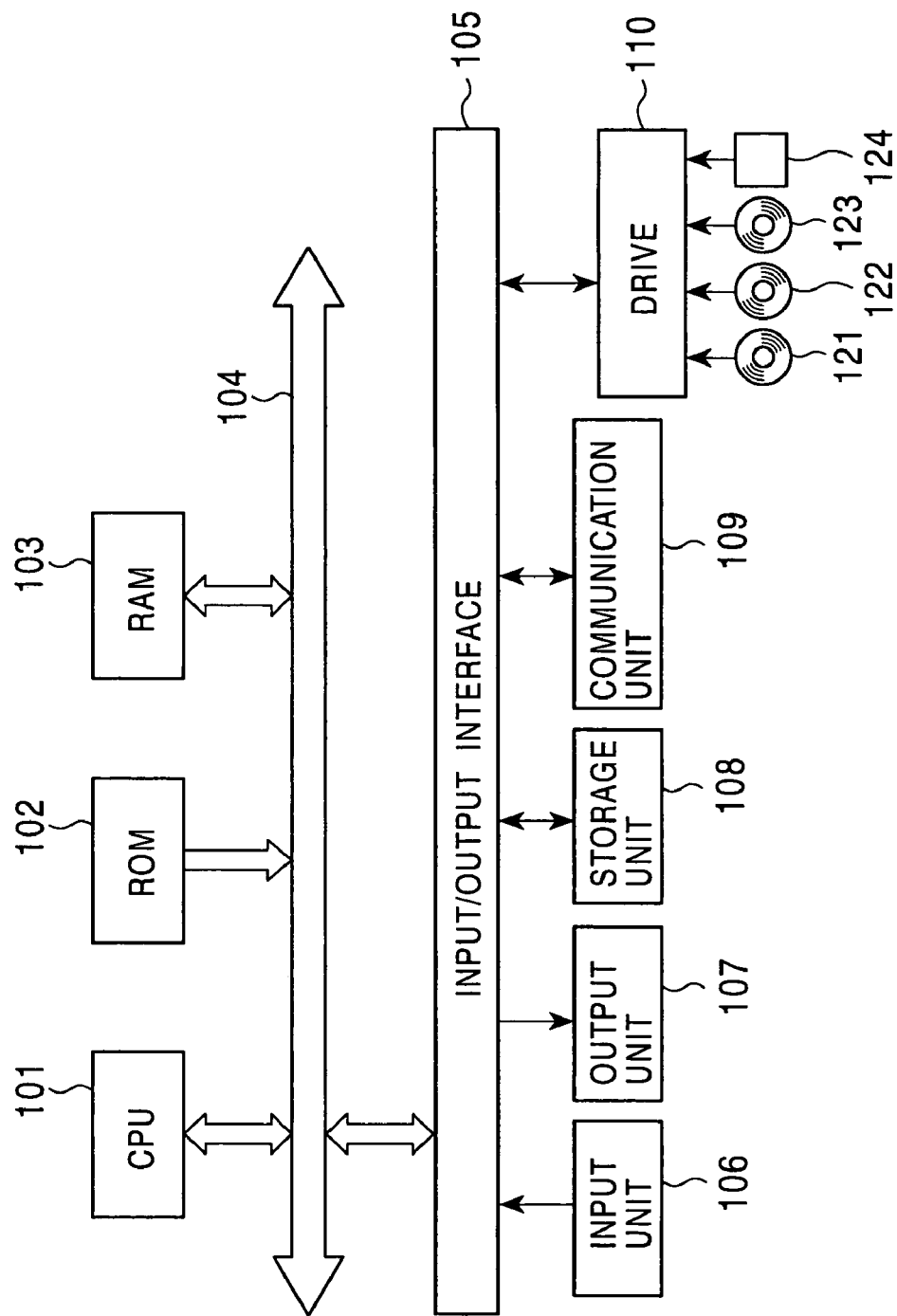
FIG. 16 illustrates the configuration of a personal computer to which the present invention may be applied.

FIG. 16 shows the internal configuration of a multi-purpose personal computer. A CPU (central processing unit) 101 of the personal computer executes various processes according to programs stored in a ROM (read-only memory) 102. A RAM (random-access memory) 103 stores data and programs required by the CPU 101 to execute various processes. An input unit 106, including a keyboard and a mouse, is connected to an input/output interface 105, which outputs signals input to the input unit 106 to the CPU 101. Also, an output unit 107, including a display and a speaker, is connected to the input/output interface 105.

Further, a storage unit 108 including a hard disk or the like and a communication unit 109 for transmitting data to and receiving data from another device through a network such as the Internet are connected to the input/output interface 105. A drive 110 is used for reading data from and writing data on recording media, such as a magnetic disk 121, an optical disk 122, a magneto-optical disk 123, and a semiconductor memory 124.

The recording media may be removable package media which store programs and which are distributed for providing the programs to users, such as the magnetic disk 121 (including a flexible disk), the optical disk 122 (including a CD-ROM (compact disc-read only memory) and DVD (digital versatile disc)), the magneto-optical disk 123 (including an MD (Mini-Disc®)), and the semiconductor memory 124. Alternatively, the recording media may be a hard disk, including the ROM 102 and the storage unit 108, which stores programs and which is distributed to users while being incorporated in a computer.

In this specification, the steps describing the program provided through a medium may be performed in time series according to the described order. Alternatively, the steps may be performed in parallel or individually.

In this specification, the system means an entire apparatus including a plurality of devices.

According to the present invention, a main program in the absolute format created by an existing development tool dedicated for a system LSI to be used can be used as-is as an application program.

Also, according to the present invention, two boot methods: "autonomous boot" for autonomously booting up the application program from a ROM; and "heteronomous boot" for heteronomously booting up the application program by copying firmware to a RAM under control of an external host or debugger in an external mode, can be used at development and commercialization without modifying the program.

Also, according to the present invention, an application can be developed from a stage before a device for a program memory and a boot memory area of a system LSI is determined, and thus codesign of the system LSI and the application can be seamlessly performed.

When a ROM is used as the boot memory area, the ROM must be rewritten or a ROM ICE must be used in order to modify the firmware. In particular, when the internal-EPROM-type is used, a ROM ICE cannot be used, and thus a complicated task of rewriting the ROM is required. However, by applying the present invention, heteronomous boot can be used without modifying the firmware, and a flexible response to frequent changes in a firmware image, such as correction of the initialization code of the firmware and device at set development, can be realized.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system for creating an application for an apparatus, comprising:

at least a CPU;

one of a volatile memory and a nonvolatile memory which include a boot memory area including a reset vector, the volatile memory being rewritable by a part other than the CPU and the nonvolatile memory being replaceable by a part other than the CPU; and one of a volatile memory and a nonvolatile memory which include a cache-executable or non-cache-executable application execution memory area, which are rewritable by a part other than the CPU, and in which initialization of a memory controller and read/write can be performed by the CPU, the memory controller being able to be initialized by a part other than the CPU as necessary in the volatile memory and the memory controller not being able to be initialized or not being required to be initialized by a part other than the CPU in the nonvolatile memory, the apparatus being able to execute an operating system and an application using the operating system and to execute a freestanding application in which the operating system is not used, wherein an application program and a bootstrap are linked so as to form a single execution file such that the entry point of the bootstrap corresponds to the entry point of the execution file, based on the single execution file, the entry point, the bootstrap, and the application program are mapped to a layout address in the application execution memory area so as to generate the execution file, the layout address in the application execution memory area corresponds to an area which is cached or not cached by the CPU, the execution file includes the layout address and the application program and the bootstrap to be mapped, when the application program is initially placed in the boot memory area, the layout address is offset-converted to an address as a load destination so that the entry point of the execution file is mapped to the reset vector in the corresponding boot memory area, whereby the input execution file is output as a load image file, when the application program is initially placed in the application execution memory area and when the placed area is not cached by the CPU, the execution file is output as-is as a load image file, when the layout address and the application program to be mapped in the execution file are initially placed in the application execution memory area and when the placed area is cached by the CPU, in order to reliably load the application program and the bootstrap to a RAM regardless of the state of a cache, the layout address is offset-converted to an address as a load destination so that the entry point of the execution file is mapped to a non-cache area of the CPU corresponding to this area, whereby the input execution file is output as a load image file, the load image file includes the address as the load destination and the application program and the bootstrap to be loaded, and when a file format different from that of the load image file is required, the format of the load image file is converted to the required format.

2. A system according to claim 1, wherein the stored execution file includes a file of the layout address and a file of the application program and the bootstrap to be mapped, and the stored load image file includes a file of the address as the load destination and a file of the application program and the bootstrap to be loaded.

3. A system according to claim 1, wherein, when the application program is initially placed in the application execution memory area, initialization is performed by a part other than the CPU, and an address and data to be initially placed are loaded in an area where the load image file is to be initially placed by using the address as the load destination and the application program and the bootstrap to be loaded stored in the load image file.

4. A system according to claim 1, wherein, when the application program is loaded in the boot memory area, the reset of the CPU is released, when the application program is loaded in the application execution memory area and when software can be started up from a part other than the boot area, a program counter is rewritten so as to indicate the loaded entry point, so as to start execution of the CPU, and when the application program is loaded in the application execution memory area and when the program counter cannot be rewritten, an instruction to jump to the loaded entry point is written in the reset vector, so as to release reset of the CPU.

5. A system according to claim 1, wherein the application program is programmed by a high-level language and an assembler and includes nonrelocatable code in an absolute format, the bootstrap includes relocatable code and nonrelocatable code in the absolute format, and is started from the relocatable code and jumps to the nonrelocatable code area by using an absolute address branch instruction so as to execute the nonrelocatable code, in the relocatable code, initialization of the CPU and data cache and a process according to a difference in a memory area to be started are performed, the application program can boot from the boot memory area and performs initialization of an instruction cache and a memory controller and copy of a code unit and initialization data of the application program from the boot memory area to the application execution memory area, as the process according to a difference in a memory area to be started, the application program can also boot from the application execution memory area which is mapped as a non-cache area of the CPU and performs initialization of the instruction cache as the process according to a difference in a memory area to be started, the application program can also boot from the application execution memory area which is mapped as a cache area of the CPU and does not perform anything as the process according to a difference in a memory area to be started, in the nonrelocatable code, initialization of a stack area, zero-initialization of the high-level language non-initialized data, setting of an exception/interrupt vector, initialization of a heap area, execution of a constructor and initializer for the high-level language global variable, flush of an entire data cache, and clearing an entire instruction cache are performed as an initialization process for a processing system, so as to jump to a main routine or to an initialization routine of the operating system, in the relocatable code of the bootstrap, a relative address branch instruction of the program counter is used for branch, call for functions, and reference to symbol in the bootstrap, in the relocatable code of the bootstrap, the offset of an execution address and a link address is added so as to calculate a branch destination and a return address and to perform reference to symbol for call for functions and reference to symbol outside the bootstrap, when the application program boots from the application execution memory area which is mapped as a cache area of the CPU, coherence of the instruction cache and data cache is kept, and when the application program boots from the application execution memory area which is mapped as a cache area of the CPU and when a multiprocessor is applied, memory coherence between processors is kept.

6. An information processing method for creating an application for an apparatus, comprising:

at least a CPU;

one of a volatile memory and a nonvolatile memory which include a boot memory area including a reset vector, the volatile memory being rewritable by a part other than the CPU and the nonvolatile memory being replaceable by a part other than the CPU; and one of a volatile memory and a nonvolatile memory which include a cache-executable or non-cache-executable application execution memory area, which are rewritable by a part other than the CPU, and in which initialization of a memory controller and read/write can be performed by the CPU, the memory controller being able to be initialized by a part other than the CPU as necessary in the volatile memory and the memory controller not being able to be initialized or not being required to be initialized by a part other than the CPU in the nonvolatile memory, the apparatus being able to execute an operating system and an application using the operating system and to execute a freestanding application in which the operating system is not used, wherein an application program and a bootstrap are linked so as to form a single execution file such that the entry point of the bootstrap corresponds to the entry point of the execution file, based on the single execution file, the entry point, the bootstrap, and the application program are mapped to a layout address in the application execution memory area so as to generate the execution file, the layout address in the application execution memory area corresponds to an area which is cached or not cached by the CPU, the execution file includes the layout address and the application program and the bootstrap to be mapped, when the application program is initially placed in the boot memory area, the layout address is offset-converted to an address as a load destination so that the entry point of the execution file is mapped to the reset vector in the corresponding boot memory area, whereby the input execution file is output as a load image file, when the application program is initially placed in the application execution memory area and when the placed area is not cached by the CPU, the execution file is output as-is as a load image file, when the layout address and the application program to be mapped in the execution file are initially placed in the application execution memory area and when the placed area is cached by the CPU, in order to reliably load the application program and the bootstrap to a RAM regardless of the state of a cache, the layout address is offset-converted to an address as a load destination so that the entry point of the execution file is mapped to a non-cache area of the CPU corresponding to this area, whereby the input execution file is output as a load image file, the load image file includes the address as the load destination and the application program and the bootstrap to be loaded, and when a file format different from that of the load image file is required, the format of the load image file is converted to the required format.

7. An information processing method according to claim 6, wherein the stored execution file includes a file of the layout address and a file of the application program and the bootstrap to be mapped, and the stored load image file includes a file of the address as the load destination and a file of the application program and the bootstrap to be loaded.

8. An information processing method according to claim 6, wherein, when the application program is initially placed in the application execution memory area, initialization is performed by a part other than the CPU, and an address and data to be initially placed are loaded in an area where the load image file is to be initially placed by using the address as the load destination and the application program and the bootstrap to be loaded stored in the load image file.

9. An information processing method according to claim 6, wherein, when the application program is loaded in the boot memory area, the reset of the CPU is released, when the application program is loaded in the application execution memory area and when software can be started up from a part other than the boot area, a program counter is rewritten so as to indicate the loaded entry point, so as to start execution of the CPU, and when the application program is loaded in the application execution memory area and when the program counter cannot be rewritten, an instruction to jump to the loaded entry point is written in the reset vector, so as to release reset of the CPU.

10. An information processing method according to claim 6, wherein the application program is programmed by a high-level language and an assembler and includes nonrelocatable code in an absolute format, the bootstrap includes relocatable code and nonrelocatable code in the absolute format, and is started from the relocatable code and jumps to the nonrelocatable code area by using an absolute address branch instruction so as to execute the nonrelocatable code, in the relocatable code, initialization of the CPU and data cache and a process according to a difference in a memory area to be started are performed, the application program can boot from the boot memory area and performs initialization of an instruction cache and a memory controller and copy of a code unit and initialization data of the application program from the boot memory area to the application execution memory area, as the process according to a difference in a memory area to be started, the application program can also boot from the application execution memory area which is mapped as a non-cache area of the CPU and performs initialization of the instruction cache as the process according to a difference in a memory area to be started, the application program can also boot from the application execution memory area which is mapped as a cache area of the CPU and does not perform anything as the process according to a difference in a memory area to be started, in the nonrelocatable code, initialization of a stack area, zero-initialization of the high-level language non-initialized data, setting of exception/interrupt vector, initialization of a heap area, execution of a constructor and initializer for the high-level language global variable, flush of an entire data cache, and clearing an entire instruction cache are performed as an initialization process for a processing system, so as to jump to a main routine or to an initialization routine of the operating system, in the relocatable code of the bootstrap, a relative address branch instruction of the program counter is used for branch, call for functions, and reference to symbol in the bootstrap, in the relocatable code of the bootstrap, the offset of an execution address and a link address is added so as to calculate a branch destination and a return address and to perform reference to symbol for call for functions and reference to symbol outside the bootstrap, when the application program boots from the application execution memory area which is mapped as a cache area of the CPU, coherence of the instruction cache and data cache is kept, and when the application program boots from the application execution memory area which is mapped as a cache area of the CPU and when a multiprocessor is applied, memory coherence between processors is kept.

* * * * *